United States Patent
Ayala Vazquez et al.

(10) Patent No.: US 11,309,628 B2
(45) Date of Patent: Apr. 19, 2022

(54) MULTIPLE-INPUT AND MULTIPLE-OUTPUT ANTENNA STRUCTURES

(71) Applicant: Apple Inc., Cupertino, CA (US)

(72) Inventors: Enrique Ayala Vazquez, Watsonville, CA (US); Hongfei Hu, Cupertino, CA (US); Mattia Pascolini, San Francisco, CA (US); Nanbo Jin, San Jose, CA (US); Matthew A. Mow, Los Altos, CA (US); Erdinc Irci, Sunnyvale, CA (US); Erica J. Tong, Pacifica, CA (US); Han Wang, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/079,284

(22) Filed: Oct. 23, 2020

(65) Prior Publication Data

US 2021/0044012 A1 Feb. 11, 2021

Related U.S. Application Data

(63) Continuation of application No. 15/657,001, filed on Jul. 21, 2017, now Pat. No. 10,886,607.

(51) Int. Cl.
*H01Q 1/24* (2006.01)
*H01Q 1/52* (2006.01)
(Continued)

(52) U.S. Cl.
CPC ............. *H01Q 1/523* (2013.01); *H01Q 1/242* (2013.01); *H01Q 1/243* (2013.01); *H01Q 1/42* (2013.01);
(Continued)

(58) Field of Classification Search
CPC .......... H01Q 1/523; H01Q 1/243; H01Q 1/44; H01Q 1/42; H01Q 1/242; H01Q 21/28; H01Q 21/06; H01Q 9/42; H01Q 5/35
See application file for complete search history.

(56) References Cited

U.S. PATENT DOCUMENTS

| | | |
|---|---|---|
| 7,157,987 B2 | 1/2007 | Brunker et al. |
| 8,350,761 B2 | 1/2013 | Hill et al. |
| | (Continued) | |

FOREIGN PATENT DOCUMENTS

| | | |
|---|---|---|
| CN | 202917626 U | 5/2013 |
| CN | 103339796 A | 10/2013 |
| | (Continued) | |

OTHER PUBLICATIONS

Agneessens et al., Compact Half Diamond Dual-Band Textile HMSIW On-body Antenna, AP1309-1302, 9 pages.

*Primary Examiner* — Awat M Salih
(74) *Attorney, Agent, or Firm* — Treyz Law Group, P.C.; Tianyi He

(57) ABSTRACT

An electronic device may include a housing and four antennas at respective corners of the housing. Cellular telephone transceiver circuitry may concurrently convey signals at one or more of the same frequencies over one or more of the four antennas using a multiple-input multiple-output (MIMO) scheme. In order to isolate adjacent antennas, dielectric-filled openings may be formed in conductive walls of the housing to divide the walls into segments that are used to form resonating element arms for the antennas. If desired, first and second antennas may include resonating element arms formed from a wall without any gaps. The first and second antennas may include adjacent return paths. A magnetic field associated with currents for the first antenna may cancel out with a magnetic field associated with currents for the second antenna at the adjacent return paths, thereby serving to electromagnetically isolate the first and second antennas.

20 Claims, 14 Drawing Sheets

(51) Int. Cl.
*H04B 7/0404* (2017.01)
*H01Q 1/44* (2006.01)
*H01Q 21/28* (2006.01)
*H01Q 1/42* (2006.01)
*H01Q 9/42* (2006.01)
*H01Q 21/06* (2006.01)
*H01Q 5/35* (2015.01)
*H01Q 5/321* (2015.01)
*H04B 1/40* (2015.01)

(52) U.S. Cl.
CPC ............ *H01Q 1/44* (2013.01); *H01Q 9/42* (2013.01); *H01Q 21/06* (2013.01); *H01Q 21/28* (2013.01); *H04B 7/0404* (2013.01); *H01Q 5/321* (2015.01); *H01Q 5/35* (2015.01); *H04B 1/40* (2013.01)

(56) References Cited

U.S. PATENT DOCUMENTS

| | | |
|---|---|---|
| 8,781,420 B2 | 7/2014 | Schlub et al. |
| 8,941,550 B2 | 1/2015 | Whitmore et al. |
| 8,947,302 B2 | 2/2015 | Caballero et al. |
| 9,246,221 B2 | 1/2016 | Jin et al. |
| 9,337,539 B1 | 5/2016 | Amanthanarayanan et al. |
| 9,385,795 B1 | 7/2016 | Ananthanarayanan et al. |
| 9,461,371 B2 | 10/2016 | Kuonanoja |
| 9,608,329 B2 | 3/2017 | Liu et al. |
| 9,653,806 B2 | 5/2017 | Ying |
| 9,653,813 B2 | 5/2017 | Smith et al. |
| 9,673,507 B2 | 6/2017 | Ramachandran et al. |
| 9,680,212 B2 | 6/2017 | Konu et al. |
| 9,698,483 B2 | 7/2017 | Liu et al. |
| 9,699,784 B2 | 7/2017 | Luong |
| 10,200,105 B2 | 2/2019 | Hu et al. |
| 10,381,715 B2 | 8/2019 | Han et al. |
| 10,476,167 B2 | 11/2019 | Ayala Vazquez et al. |
| 10,498,011 B2 | 12/2019 | Han et al. |
| 10,511,083 B2 | 12/2019 | Han et al. |
| 2010/0007564 A1 | 1/2010 | Hill et al. |
| 2011/0250928 A1 | 10/2011 | Schlub et al. |
| 2012/0009983 A1 | 1/2012 | Mow et al. |
| 2013/0016633 A1 | 1/2013 | Lum et al. |
| 2013/0234741 A1 | 9/2013 | Mow et al. |
| 2014/0078008 A1 | 3/2014 | Kang et al. |
| 2014/0192845 A1 | 7/2014 | Szini et al. |
| 2014/0266922 A1 | 9/2014 | Jin et al. |
| 2014/0266941 A1 | 9/2014 | Vazquez et al. |
| 2014/0266968 A1 | 9/2014 | Wong et al. |
| 2014/0361941 A1 | 12/2014 | Jenwatanavet et al. |
| 2015/0249916 A1 | 9/2015 | Schlub et al. |
| 2015/0365946 A1 | 12/2015 | Luong |
| 2016/0211570 A1 | 7/2016 | Jin et al. |
| 2016/0248148 A1 | 8/2016 | Hill et al. |
| 2016/0124667 A1 | 10/2016 | Jin et al. |
| 2016/0322699 A1 | 11/2016 | Mow et al. |
| 2017/0125889 A1 | 5/2017 | Pascolini et al. |
| 2017/0142241 A1 | 5/2017 | Kim et al. |
| 2018/0090847 A1 | 3/2018 | Romano et al. |
| 2018/0248252 A1 | 8/2018 | Hu et al. |
| 2018/0261921 A1 | 9/2018 | Ha et al. |
| 2018/0301787 A1 | 10/2018 | Han et al. |
| 2018/0342794 A1* | 11/2018 | Han .............. H01Q 5/328 |
| 2018/0358699 A1 | 12/2018 | Li et al. |
| 2019/0027822 A1 | 1/2019 | Ayala Vazquez et al. |
| 2019/0027833 A1* | 1/2019 | Ayala Vazquez ........ H01Q 9/42 |

FOREIGN PATENT DOCUMENTS

| | | |
|---|---|---|
| CN | 102683900 B | 10/2014 |
| CN | 105789836 A | 7/2016 |
| CN | 106898865 A | 6/2017 |
| CN | 106921032 A | 7/2017 |
| GB | 201312904 | 9/2013 |
| JP | 2013255153 A | 12/2013 |
| JP | 3204587 U | 6/2016 |
| KR | 20120102516 A | 9/2012 |
| KR | 20140041939 A | 4/2014 |
| WO | 2013060683 A1 | 5/2013 |

* cited by examiner

US 11,309,628 B2

MULTIPLE-INPUT AND MULTIPLE-OUTPUT ANTENNA STRUCTURES

This application is a continuation of patent application Ser. No. 15/657,001, filed Jul. 21, 2017, which is hereby incorporated by reference herein in its entirety.

BACKGROUND

This relates generally to electronic devices and, more particularly, to electronic devices with wireless communications circuitry.

Electronic devices often include wireless circuitry with antennas. For example, cellular telephones, computers, and other devices often contain antennas for supporting wireless communications.

It can be challenging to form electronic device antenna structures with desired attributes. In some wireless devices, antennas are bulky. In other devices, antennas are compact, but are sensitive to the position of the antennas relative to external objects. It is often difficult to perform wireless communications with a satisfactory data rate (data throughput) using a single antenna in a wireless device, especially as software applications performed by wireless devices become increasingly data hungry. In order to increase the possible data rate for the wireless device, wireless devices can include multiple antennas that convey radio-frequency signals at the same frequency. However, it can be difficult to electromagnetically isolate multiple antennas operating at the same frequency, potentially leading to interference between the radio-frequency signals conveyed by each of the antennas and deterioration in the radio-frequency performance of the wireless device.

It would therefore be desirable to be able to provide improved wireless circuitry for electronic devices such as electronic devices that include multiple antennas.

SUMMARY

An electronic device may be provided with wireless circuitry. The wireless circuitry may include multiple antennas and transceiver circuitry. The electronic device may include a housing having opposing first and second ends and a rectangular periphery with first and second corners at the first end and third and fourth corners at the second end.

The antennas may include a first antenna at the first corner, a second antenna at the second corner, a third antenna at the third corner, and a fourth antenna at the fourth corner. The first and fourth antennas may occupy a greater spatial volume than the first and second antennas. Transceiver circuitry such as cellular telephone transceiver circuitry may concurrently convey radio-frequency signals at one or more of the same frequencies over the first, second, third, and/or fourth antennas using a multiple-input multiple-output (MIMO) scheme. For example, the transceiver circuitry may convey radio-frequency signals at a first frequency using the first and fourth antennas and at a second frequency that is greater than the first frequency using the first, second, third, and fourth antennas. If desired, the transceiver circuitry may also concurrently convey radio-frequency signals at a third frequency that is greater than the second frequency using the first and fourth antennas or using all of the first, second, third, and fourth antennas.

The housing may include peripheral conductive housing walls. The antennas may each include resonating element arms that are formed from the peripheral conductive housing walls. In order to ensure that adjacent antennas are electromagnetically isolated when operating at the same frequency, a dielectric-filled opening in a given peripheral conductive wall may divide the wall into first and second segments that are used to form resonating element arms for the first and second antennas, respectively. Similarly, a dielectric-filled opening may be formed in an additional conductive wall that divides the additional wall into third and fourth segments that are used to form resonating element arms for the third and fourth antennas, respectively. If desired, switching circuitry may be coupled between the first and second antennas and the third and fourth antennas. The switching circuitry may have a state at which the first and second antennas are configured to form a single fifth antenna and the third and fourth antennas are configured to form a single sixth antenna. The transceiver circuitry may concurrently convey radio-frequency signals over the fifth and sixth antennas at one or more of the same frequencies using a MIMO scheme if desired.

In another suitable arrangement, the first and second antennas may include resonating element arms that are formed from portions of a conductive housing wall without any dielectric-filled gaps. In this example, the first and second antennas may include adjacent return paths coupled between the housing wall and an internal ground plane. A magnetic field associated with currents for the first antenna may cancel out with a magnetic field associated with currents for the second antenna as the currents flow over the adjacent return paths, thereby serving to electromagnetically isolate the first and second antennas even though the first and second antennas are both formed from a single continuous housing wall.

DETAILED DESCRIPTION

Figure 1:
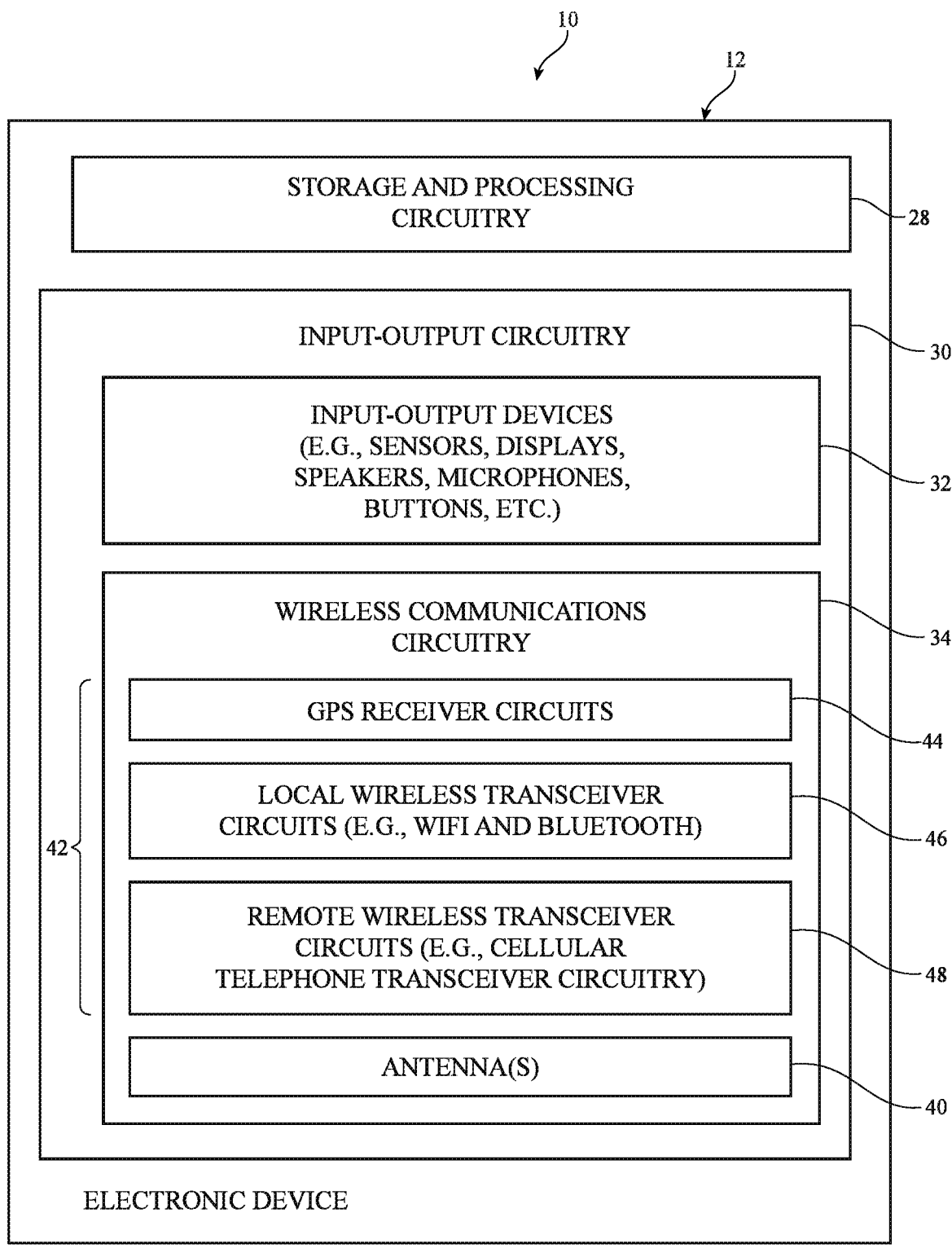
FIG. 1 is a schematic diagram of illustrative circuitry in an electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one or more antennas. The antennas of the wireless communications circuitry can include loop antennas, inverted-F antennas, strip antennas, planar inverted-F antennas, slot antennas, dipole antennas, monopole antennas, helical antennas, patch antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a portable electronic device such as a laptop computer, a tablet computer, a cellular telephone, a media player, a remote control device, a wearable device such as a wristwatch device, pendant device, headphone or earpiece device, virtual or augmented reality headset device, device embedded in eyeglasses or other equipment worn on a user's head, or other wearable or miniature device, gaming controller, computer mouse, keyboard, mousepad, a navigation device, or trackpad or touchpad device, or electronic device 10 may be a larger device such as a television, a computer monitor containing an embedded computer, a computer display that does not contain an embedded computer, a gaming device, an embedded system such as a system in which electronic equipment is mounted in a kiosk, building, vehicle, or automobile, a wireless access point or base station, a desktop computer, equipment that implements the functionality of two or more of these devices, or other electronic equipment. Other configurations may be used for device 10 if desired. The example of FIG. 1 is merely illustrative.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

FIG. 1 is a schematic diagram showing illustrative components that may be used in device 10. As shown in FIG. 1, device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols (e.g., Long-Term Evolution (LTE) protocols, LTE Advanced protocols, Global System for Mobile Communications (GSM) protocols, Universal Mobile Telecommunications System (UMTS) protocols, or other mobile telephone protocols), multiple-input and multiple-output (MIMO) protocols, antenna diversity protocols, combinations of these, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 42 for handling various radio-frequency communications bands. For example, circuitry 34 may include transceiver circuitry 44, 46, and 48. Transceiver circuitry 46 may handle 2.4 GHz and 5 GHz bands for WiFi® (IEEE 802.11) communications or other wireless local area network (WLAN) bands and may handle the 2.4 GHz Bluetooth® communications band or other wireless personal area network (WPAN) bands. Circuitry 34 may use cellular telephone transceiver circuitry 48 for handling wireless communications in frequency ranges such as a low communications band from 700 to 960 MHz, a low midband from 1400-1520 MHz, a midband from 1710 to 2170 MHz, and a high band from 2300 to 2700 MHz or other communications bands between 700 MHz and 4000 MHz or other suitable frequencies (as examples). Circuitry 48 may handle voice data and non-voice data using one or more cellular telephone protocols (e.g., Long-Term Evolution (LTE) protocols, LTE Advanced protocols, Global System for Mobile Communications (GSM) protocols, Universal Mobile Telecommunications System (UMTS) protocols, other mobile telephone protocols, etc.).

Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 44 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 2:
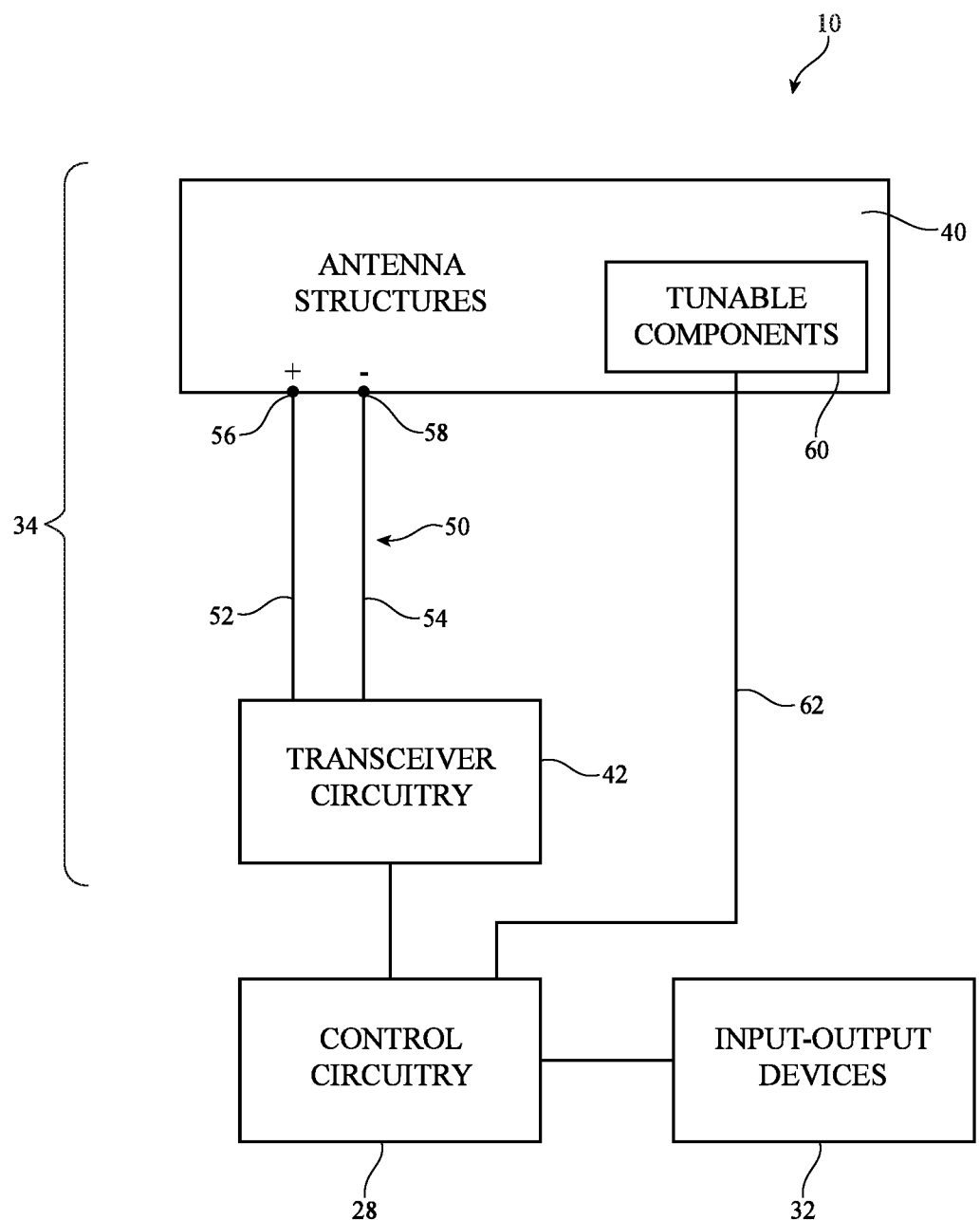
FIG. 2 is a schematic diagram of illustrative wireless circuitry in accordance with an embodiment.

As shown in FIG. 2, transceiver circuitry 42 in wireless circuitry 34 may be coupled to antenna structures 40 using paths such as path 50. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 60 to tune antennas over communications bands of interest. Tunable components 60 may be part of a tunable filter or tunable impedance matching network, may be part of an antenna resonating element, may span a gap between an antenna resonating element and antenna ground, etc. Tunable components 60 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 62 that adjust inductance values, capacitance values, or other parameters associated with tunable components 60, thereby tuning antenna structures 40 to cover desired communications bands. If desired, components 60 may include fixed (non-adjustable) tuning components such as capacitors, resistors, and/or inductors.

Path 50 may include one or more transmission lines. As an example, signal path 50 of FIG. 2 may be a transmission line having a positive signal conductor such as line 52 and a ground signal conductor such as line 54. Lines 52 and 54 may form parts of a coaxial cable, a stripline transmission line, or a microstrip transmission line (as examples). A matching network formed from components such as fixed or tunable inductors, resistors, and capacitors may be used in matching the impedance of antenna(s) 40 to the impedance of transmission line 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components (e.g., components 60).

Transmission line 50 may be coupled to antenna feed structures such as antenna feed 55 associated with antenna structures 40. As an example, antenna structures 40 may form an inverted-F antenna, a slot antenna, a hybrid inverted-F slot antenna or other antenna having an antenna feed with a positive antenna feed terminal such as terminal 56 and a ground antenna feed terminal such as ground antenna feed terminal 58. Positive transmission line conductor 52 may be coupled to positive antenna feed terminal 56 and ground transmission line conductor 54 may be coupled to ground antenna feed terminal 58. Other types of antenna feed arrangements may be used if desired. For example, antenna structures 40 may be fed using multiple feeds. The illustrative feeding configuration of FIG. 2 is merely illustrative.

Antenna structures 40 may include resonating element structures, antenna ground plane structures, an antenna feed such as feed 55, and other components (e.g., tunable components 60). Antenna structures 40 may be configured to form any suitable types of antenna. With one suitable arrangement, which is sometimes described herein as an example, antenna structures 40 are used to implement a hybrid inverted-F-slot antenna that includes both inverted-F and slot antenna resonating elements.

Figure 3:
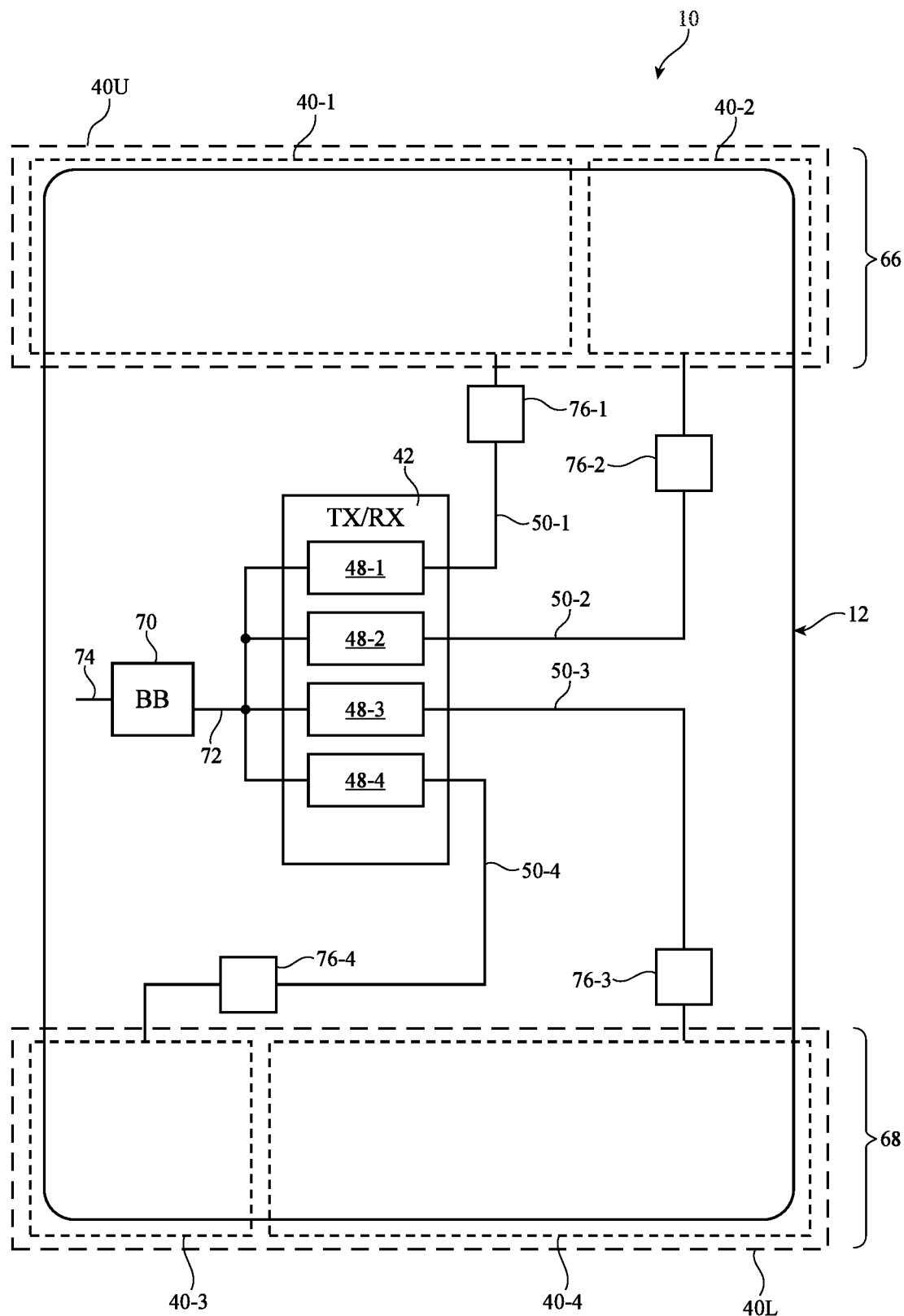
FIG. 3 is a diagram of illustrative wireless circuitry including multiple antennas for performing multiple-input and multiple-output (MIMO) communications in accordance with an embodiment.

If desired, multiple antennas 40 may be formed in device 10. Each antenna 40 may be coupled to transceiver circuitry 42 over respective transmission lines 50. If desired, two or more antennas 40 may share the same transmission line structures 50. FIG. 3 is a diagram showing how device 10 may include multiple antennas 40 for performing wireless communications.

As shown in FIG. 3, device 10 may include two or more antennas 40 such as a first antenna 40-1, a second antenna 40-2, a third antenna 40-3, and a fourth antenna 40-4. Antennas 40 may be provided at different locations within housing 12 of device 10. For example, antennas 40-1 and 40-2 may be formed within region 66 at a first (upper) end of housing 12 whereas antennas 40-3 and 40-4 are formed within region 68 at an opposing second (lower) end of housing 12. In the example of FIG. 3, housing 12 has a rectangular periphery (e.g., a periphery having four corners) and each antenna 40 is formed at a respective corner of housing 12. This example is merely illustrative and, in general, antennas 40 may be formed at any desired location within housing 12.

Wireless circuitry 34 may include input-output ports such as port 74 for interfacing with digital data circuits in storage and processing circuitry 28 (FIG. 1). Wireless circuitry 34 may include baseband circuitry such as baseband (BB) processor 70 and radio-frequency transceiver circuitry such as transceiver circuitry 42.

Port 74 may receive digital data from storage and processing circuitry 28 that is to be transmitted by transceiver circuitry 42. Incoming data that has been received by transceiver circuitry 42 and baseband processor 70 may be supplied to storage and processing circuitry 28 via port 74.

Transceiver circuitry 42 may include one or more transmitters and one or more receivers. For example, transceiver circuitry 42 may include multiple remote wireless transceiver circuits 48 (FIG. 1) such as a first transceiver 48-1, a second transceiver 48-2, a third transceiver 48-3, and a fourth transceiver 48-4 (e.g., transceivers for handling voice and non-voice cellular telephone communications in cellular telephone communications bands). Each transceiver 48 may be coupled to a respective antenna 40 over a corresponding transmission line 50. For example, first transceiver 48-1 may be coupled to antenna 40-1 over transmission line 50-1, second transceiver 48-2 may be coupled to antenna 40-2 over transmission line 50-2, third transceiver 48-3 may be coupled to antenna 40-3 over transmission line 50-3, and fourth transceiver 48-4 may be coupled to antenna 40-4 over transmission line 50-4.

Radio-frequency front end circuitry 76 may be interposed on each transmission line 50 (e.g., first front end circuits 76-1 may be interposed on line 50-1, second front end circuits 76-2 may be interposed on line 50-2, third front end circuits 76-3 may be interposed on line 50-3, etc.). Front end circuitry 76 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission line 50 to the corresponding antenna 40, networks of active and/or passive components such as components 60 of FIG. 2, radio-frequency coupler circuitry for gathering antenna impedance measurements, or any other desired radio-frequency circuitry. If desired, front end circuitry 76 may include switching circuitry that is configured to selectively couple antennas 40-1, 40-2, 40-3, and 40-4 to different respective transceivers 48-1, 48-2, 48-3, and 48-4 (e.g., so that each antenna can handle communications for different transceivers 48 over time based on the state of the switching circuits in front end circuitry 76).

If desired, front end circuits 76 may include filtering circuitry (e.g., duplexers and/or diplexers) that allow the corresponding antenna 40 to transmit and receive radio-frequency signals at the same time (e.g., using a frequency domain duplexing (FDD) scheme). Antennas 40-1, 40-2, 40-3, and 40-4 may transmit and/or receive radio-frequency signals in respective time slots or two or more of antennas 40-1, 40-2, 40-3, and 40-4 may transmit and/or receive radio-frequency signals concurrently. In general, any desired combination of transceivers 48-1, 48-2, 48-3, and 48-4 may transmit and/or receive radio-frequency signals using the corresponding antenna 40 at a given time. In one suitable arrangement, each of transceivers 48-1, 48-2, 48-3, and 48-4 may receive radio-frequency signals while a given one of transceivers 48-1, 48-2, 48-3, and 48-4 transmits radio-frequency signals at a given time.

Amplifier circuitry such as one or more power amplifiers may be interposed on transmission lines 50 and/or formed within transceiver circuitry 42 for amplifying radio-frequency signals output by transceivers 48 prior to transmission over antennas 40. Amplifier circuitry such as one or more low noise amplifiers may be interposed on transmission lines 50 and/or formed within transceiver circuitry 42 for amplifying radio-frequency signals received by antennas 40 prior to conveying the received signals to transceivers 48.

In the example of FIG. 3, separate front end circuits 76 are formed on each transmission line 50. This is merely illustrative. If desired, two or more transmission lines 50 may share the same front end circuits 76 (e.g., front end circuits 76 may be formed on the same substrate, module, or integrated circuit).

Each of transceivers 48 may, for example, include circuitry for converting baseband signals received from baseband processor 70 over path 72 into corresponding radio-frequency signals. For example, transceivers 48 may each include mixer circuitry for up-converting the baseband signals to radio-frequencies prior to transmission over antennas 40. Transceivers 48 may include digital to analog converter (DAC) and/or analog to digital converter (ADC) circuitry for converting signals between digital and analog domains. Each of transceivers 48 may include circuitry for converting radio-frequency signals received from antennas 40 over paths 50 into corresponding baseband signals. For example, transceivers 48 may each include mixer circuitry for down-converting the radio-frequency signals to baseband frequencies prior to conveying the baseband signals to baseband processor 70 over paths 72.

Each transceiver 48 may be formed on the same substrate, integrated circuit, or module (e.g., transceiver circuitry 42 may be a transceiver module having a substrate or integrated circuit on which each of transceivers 48 are formed) or two or more transceivers 48 may be formed on separate substrates, integrated circuits, or modules. Baseband circuitry 70 and front end circuits 76 may be formed on the same substrate, integrated circuit, or module as transceiver circuits 48 or may be formed on separate substrates, integrated circuits, or modules from transceiver circuits 48. In another suitable arrangement, transceiver circuitry 42 may include a single transceiver 48 having four ports, each of which is coupled to a respective transmission line 50, if desired. Each transceiver 48 may include transmitter and receiver circuitry for both transmitting and receiving radio-frequency signals. In another suitable arrangement, one or more transceivers 48 may perform only signal transmission or signal reception (e.g., one or more of circuits 48 may be a dedicated transmitter or dedicated receiver).

In the example of FIG. 3, antennas 40-1 and 40-4 may occupy a larger space (e.g., a larger area or volume within device 10) than antennas 40-2 and 40-3. This may allow antennas 40-1 and 40-4 to support communications at longer wavelengths (i.e., lower frequencies) than antennas 40-2 and 40-3. This is merely illustrative and, if desired, each of antennas 40-1, 40-2, 40-3, and 40-4 may occupy the same volume or may occupy different volumes. Antennas 40-1, 40-2, 40-3, and 40-4 may be configured to convey radio-frequency signals in at least one common frequency band. If desired, one or more of antennas 40-1, 40-2, 40-3, and 40-4 may handle radio-frequency signals in at least one frequency band that is not covered by one or more of the other antennas in device 10.

If desired, each antenna 40 and each transceiver 48 may handle radio-frequency communications in multiple frequency bands (e.g., multiple cellular telephone communications bands). For example, transceiver 48-1, antenna 40-1, transceiver 48-4, and antenna 40-4, may handle radio-frequency signals in a first frequency band such as a low band between 700 and 960 MHz, a second frequency band such as a midband between 1700 and 2200 MHz, and a third frequency band such as a high band between 2300 and 2700 MHz. Transceiver 48-2, antenna 40-2, transceiver 48-3, and antenna 40-3 may handle radio-frequency signals in the second frequency band between 1700 and 2200 MHz and the third frequency band between 2300 and 2700 MHz (e.g., antennas 40-2 and 40-3 may not occupy sufficient volume to support signals within the low band).

The example of FIG. 3 is merely illustrative. In general, antennas 40 may cover any desired frequency bands. Transceiver circuitry 42 may include other transceiver circuits such as one or more circuits 36 of FIG. 1 coupled to one or more antennas 40. Housing 12 may have any desired shape. Forming each of antennas 40-1 through 40-4 at different corners of housing 12 may, for example, maximize the multi-path propagation of wireless data conveyed by antennas 40 to optimize overall data throughput for wireless circuitry 34.

When operating using a single antenna 40, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless communications circuitry 34 in communicating with the external communications equipment. As software applications and other device operations increase in complexity over time, the amount of data that needs to be conveyed between device 10 and the external communications equipment typically increases, such that a single antenna 40 may not be capable of providing sufficient data throughput for handling the desired device operations.

In order to increase the overall data throughput of wireless circuitry 34, multiple antennas 40 may be operated using a multiple-input and multiple-output (MIMO) scheme. When operating using a MIMO scheme, two or more antennas 40 on device 10 may be used to convey multiple independent streams of wireless data at the same frequency. This may significantly increase the overall data throughput between device 10 and the external communications equipment relative to scenarios where only a single antenna 40 is used. In general, the greater the number of antennas 40 that are used for conveying wireless data under the MIMO scheme, the greater the overall throughput of circuitry 34.

However, if care is not taken, radio-frequency signals conveyed in the same frequency band by multiple antennas 40 may interfere with each other, serving to deteriorate the overall wireless performance of circuitry 34. Ensuring that antennas operating at the same frequency are electromagnetically isolated from each other can be particularly challenging for adjacent antennas 40 (e.g., antennas 40-1 and 40-2, antennas 40-3 and 40-4, etc.) and for antennas 40 that have common (shared) structures (e.g., that have resonating elements formed from adjacent or shared conductive portions of housing 12).

In order to perform wireless communications under a MIMO scheme, antennas 40 need to convey data at the same frequencies. If desired, wireless circuitry 34 may perform so-called two-stream (2×) MIMO operations (sometimes referred to herein as 2×MIMO communications or communications using a 2×MIMO scheme) in which two antennas 40 are used to convey two independent streams of radio-frequency signals at the same frequency. Wireless circuitry 34 may perform so-called four-stream (4×) MIMO operations (sometimes referred to herein as 4×MIMO communications or communications using a 4×MIMO scheme) in which four antennas 40 are used to convey four independent streams of radio-frequency signals at the same frequency. Performing 4×MIMO operations may support higher overall data throughput than 2×MIMO operations because 4×MIMO operations involve four independent wireless data streams whereas 2×MIMO operations involve only two independent wireless data streams. If desired, antennas 40-1, 40-2, 40-3, and 40-4 may perform 2×MIMO operations in some frequency bands and may perform 4×MIMO operations in other frequency bands (e.g., depending on which bands are handled by which antennas). Antennas 40-1, 40-2, 40-3, and 40-4 may perform 2×MIMO operations in some bands concurrently with performing 4×MIMO operations in other bands, for example.

As one example, antennas 40-1 and 40-4 (and the corresponding transceivers 48-1 and 48-4) may perform 2×MIMO operations by conveying radio-frequency signals at the same frequency in a low band between 600 MHz and 960 MHz. At the same time, antennas 40-1, 40-2, 40-3, and 40-4 may collectively perform 4×MIMO operations by conveying radio-frequency signals at the same frequency in a midband between 1700 and 2200 MHz and/or at the same frequency in a high band between 2300 and 2700 MHz (e.g., antennas 40-1 and 40-4 may perform 2×MIMO operations in the low band concurrently with performing 4×MIMO operations in the midband and/or high band).

If desired, antennas 40-1 and 40-2 may include switching circuitry that is adjusted by control circuitry 28. Control circuitry 28 may control the switching circuitry in antennas 40-1 and 40-2 to configure antenna structures in antennas 40-1 and 40-2 to form a single antenna 40U in region 66 of device 10. Similarly, antennas 40-3 and 40-4 may include switching circuitry that is adjusted by control circuitry 28. Control circuitry 28 may control the switching circuitry in antennas 40-3 and 40-4 to form a single antenna 40L (e.g., an antenna 40L that includes antenna structures from antennas 40-3 and 40-4) in region 68 of device 10. Antenna 40U may, for example, be formed at an upper end of housing 12 and may therefore sometimes be referred to herein as upper antenna 40U. Antenna 40L may be formed at an opposing lower end of housing 12 and may therefore sometimes be referred to herein as lower antenna 40L.

When antennas 40-1 and 40-2 are configured to form upper antenna 40U and antennas 40-3 and 40-4 are configured to form lower antenna 40L, wireless circuitry 34 may perform 2×MIMO operations using antennas 40U and 40L in one, two, or each of the low band, midband, and high band, for example. If desired, control circuitry 28 may toggle the switching circuitry over time to switch wireless circuitry 34 between a first mode in which antennas 40-1, 40-2, 40-3, and 40-4 perform 2×MIMO operations in the low band and 4×MIMO operations in the midband and/or high band and a second mode in which antennas 40-1, 40-2, 40-3, and 40-4 are configured to form antennas 40U and 40L that perform 2×MIMO operations in the low band, midband, and/or high band.

Figure 4:
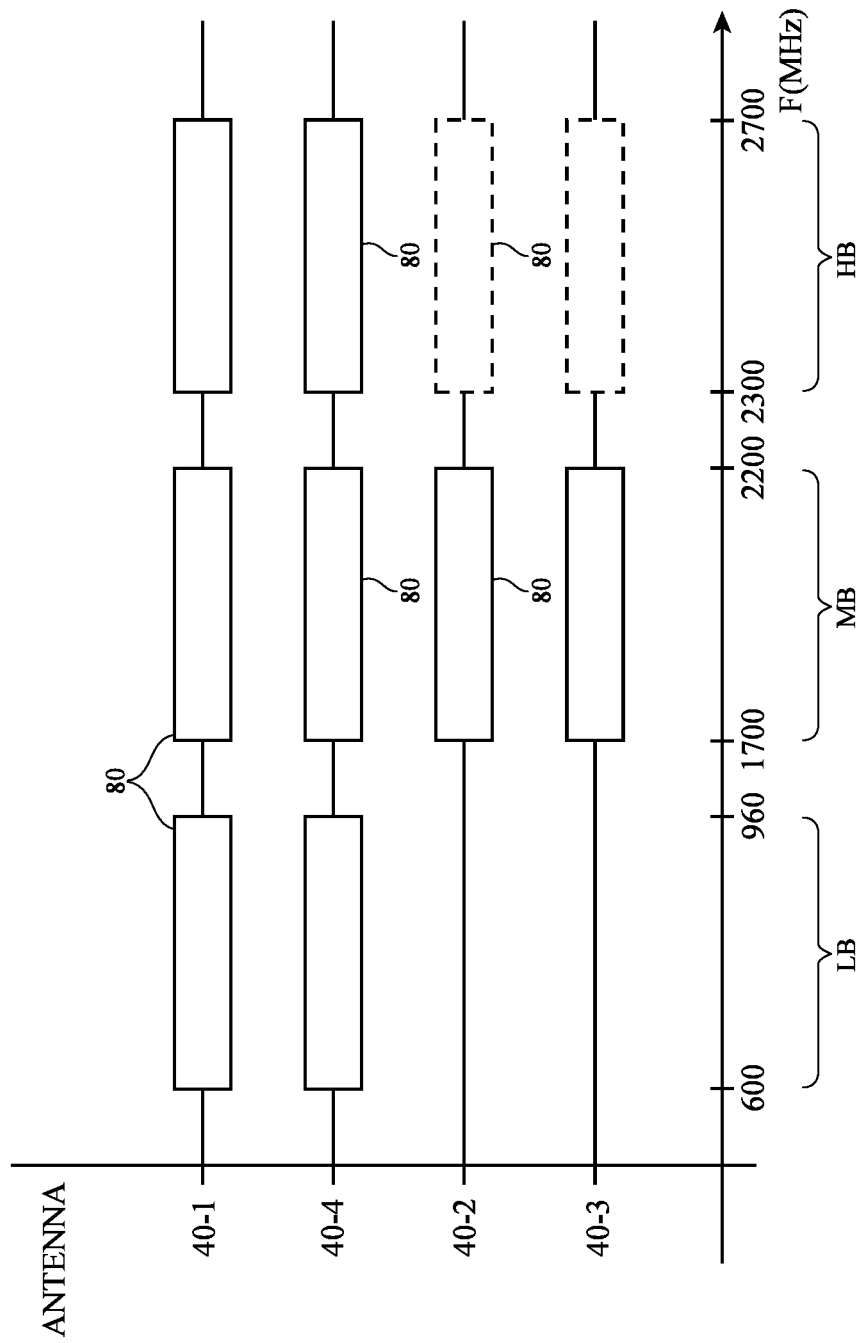
FIG. 4 is a plot showing how illustrative antennas of the type shown in FIG. 3 may perform wireless communications in multiple frequency bands in accordance with an embodiment.

FIG. 4 is a diagram showing how antennas 40-1, 40-2, 40-3, and 40-4 may cover multiple frequency bands for performing MIMO operations. As shown in FIG. 4, frequency is plotted on the horizontal axis. Coverage blocks 80 represent frequency bands that may be covered by antennas 40-1, 40-2, 40-3, or 40-4 in performing MIMO operations. Transceivers 48 and antennas 40 may perform wireless communications in a first (low) band LB (e.g., a cellular telephone band between 600 and 960 MHz), a second band (midband) MB (e.g., a cellular telephone band between 1700 and 2200 MHz), and/or a third (high) band HB (e.g., a cellular telephone band between 2300 and 2700 MHz).

First antenna 40-1 and fourth antenna 40-4 may cover low band LB, midband MB, and high band HB (e.g., antennas 40-1 and 40-4 may each transmit and/or receive wireless signals in one, two, or each of bands LB, MB, and HB). First antenna 40-1 and fourth antenna 40-4 may perform 2×MIMO operations at the same frequency in low band LB (e.g., because both antennas 40-1 and 40-4 have sufficient volume and are configured to handle signals in low band LB). Second antenna 40-2 and third antenna 40-3 may each cover midband MB and optionally high band HB (e.g., antennas 40-2 and 40-3 may each transmit and/or receive wireless signals in one or both of bands MB and HB). First antenna 40-1, second antenna 40-2, third antenna 40-3, and fourth antenna 40-4 may each perform 4×MIMO operations at the same frequency in midband MB. First antenna 40-1 and fourth antenna 40-4 may perform 2×MIMO operations at the same frequency in high band HB or, in scenarios where antennas 40-2 and 40-3 are configured to cover high band HB, antennas 40-1, 40-2, 40-3, and 40-4 may perform 4×MIMO operations at the same frequency in high band HB.

Antennas 40 may contribute a corresponding amount of data throughput to wireless circuitry 34 in communicating with external communications equipment for each frequency that is covered by each antenna (e.g., each coverage block 80 may represent data throughput capability that is added to wireless circuitry 34 by the corresponding antenna). For example, each antenna 40 may contribute a data throughput of 40 MB/s for each coverage block 80. In this scenario, antennas 40 may exhibit a data throughput of 320 MB/s if antennas 40-2 and 40-3 do not cover high band HB (e.g., with antennas 40-1 and 40-2 performing 2×MIMO operations in low band LB and high band HB and antennas 40-1 through 40-4 performing 4×MIMO operations in midband MB) and may exhibit a data throughput of 400 MB/s if antennas 40-2 and 40-3 cover high band HB (e.g., with antennas 40-1 through 40-4 performing 4×MIMO operations in both midband MB and high band HB and antennas 40-1 and 40-4 performing 2×MIMO operations in low band LB).

If desired, wireless communications circuitry 34 may convey wireless data with multiple antennas on one or more external devices (e.g., multiple wireless base stations) in a scheme sometimes referred to as carrier aggregation. When operating using a carrier aggregation scheme, the same antenna 40 may convey radio-frequency signals with multiple antennas (e.g., antennas on different wireless base stations) at different respective frequencies (sometimes referred to herein as carrier frequencies, channels, carrier channels, or carriers). For example, antenna 40-1 may receive radio-frequency signals from a first wireless base station at a first frequency (e.g., a frequency in low band LB), from a second wireless base station at a second frequency (e.g., a frequency in midband MB), and a from a third base station at a third frequency (e.g., a frequency in high band HB). The received signals at different frequencies may be simultaneously processed (e.g., by transceiver 48-1) to increase the communications bandwidth of transceiver 48-1, thereby increasing the data rate of transceiver 48-1. If desired, antenna 40-1 may convey radio-frequency signals with more than three base stations (e.g., using more than one frequency in low band LB, midband MB, and/or high band HB). Similarly, antenna 40-4 may perform carrier aggregation at two, three, or more than three frequencies within bands LB, MB, and/or HB, and antennas 40-2 and 40-3 may perform carrier aggregation at two or more frequencies within bands MB and/or HB. This may serve to further increase the overall data throughput of wireless circuitry 34 relative to scenarios where no carrier aggregation is performed. For example, the data throughput of circuitry 34 may increase for each carrier frequency (e.g., each carrier frequency within bands LB, MB, and HB) that is used (e.g., for each wireless base station that communicates with each of antennas 40-1, 40-2, 40-3, and 40-4).

By performing communications using both a MIMO scheme and a carrier aggregation scheme, the data throughput of wireless circuitry 34 may be even greater than in scenarios where either a MIMO scheme or a carrier aggregation scheme is used. The data throughput of circuitry 34 may, for example, increase for each carrier frequency that is used by antennas 40 (e.g., each carrier frequency may contribute 40 MB/s or some other throughput to the total throughput of circuitry 34). As one example, antennas 40-1 and 40-4 may perform carrier aggregation across three frequencies within each of bands LB, MB, and HB and antennas 40-3 and 40-4 may perform carrier aggregation across three frequencies within each of bands MB and HB. At the same time, antennas 40-1 and 40-4 may perform 2×MIMO operations in low band LB using and antennas 40-1, 40-2, 40-3, and 40-4 may perform 4×MIMO operations in one of bands MB and HB. In this scenario, with an exemplary throughput of 40 MB/s per carrier frequency, wireless circuitry 34 may exhibit a throughput of approximately 960 MB/s. If 4×MIMO operations are performed in both bands MB and HB by antennas 40-1, 40-2, 40-3, and 40-4, circuitry 34 may exhibit an even greater throughput of approximately 1200 MB/s. In other words, the data throughput of wireless circuitry 34 may be increased from the 40 MB/s associated with conveying signals at a single frequency with a single antenna to approximately 1 GB/s by performing communications using MIMO and carrier aggregation schemes using four antennas 40-1, 40-2, 40-3, and 40-4. These examples are merely illustrative and, if desired, carrier aggregation may be performed in fewer than three carriers per band, may be performed across different bands, or may be omitted for one or more of antennas 40-1 through 40-4. If desired, pairs of antennas 40-1, 40-2, 40-3, and 40-4 may perform 2×MIMO operations in bands MB or HB or antennas 40-1 through 40-4 may not perform MIMO operations in one of bands LB, MB, and HB (e.g., antennas 40-1, 40-2, 40-3, and 40-4 need not utilize their full throughput capacity if desired).

When antennas 40-1 and 40-2 are configured to form antenna 40U and antennas 40-3 and 40-4 are configured to form antenna 40L, antennas 40U and 40L may each perform 2×MIMO operations in none, one, two, or all three of bands LB, MB, and HB. If desired, antennas 40U and 40L may perform communications using a carrier aggregation scheme using one more carrier frequencies in bands LB, MB, and/or HB. Control circuitry 28 may toggle antennas 40-1, 40-2, 40-3, and 40-4 between a first mode in which antennas 40-1, 40-2, 40-3, and 40-4 perform 2×MIMO operations in some bands and 4×MIMO operations in other bands and a second mode in which antennas 40U and 40L perform 2×MIMO operations in one or more bands over time to further increase the overall data throughput of circuitry 34 if desired. Control circuitry 28 may also switch between the first and second mode to meet desired antenna efficiency or data throughput requirements. The example of FIG. 4 is merely illustrative. If desired, antennas 40 may cover any desired number of frequency bands at any desired frequencies. More than four antennas 40 or fewer than four antennas 40 may perform MIMO and/or carrier aggregation operations if desired.

Figure 5:
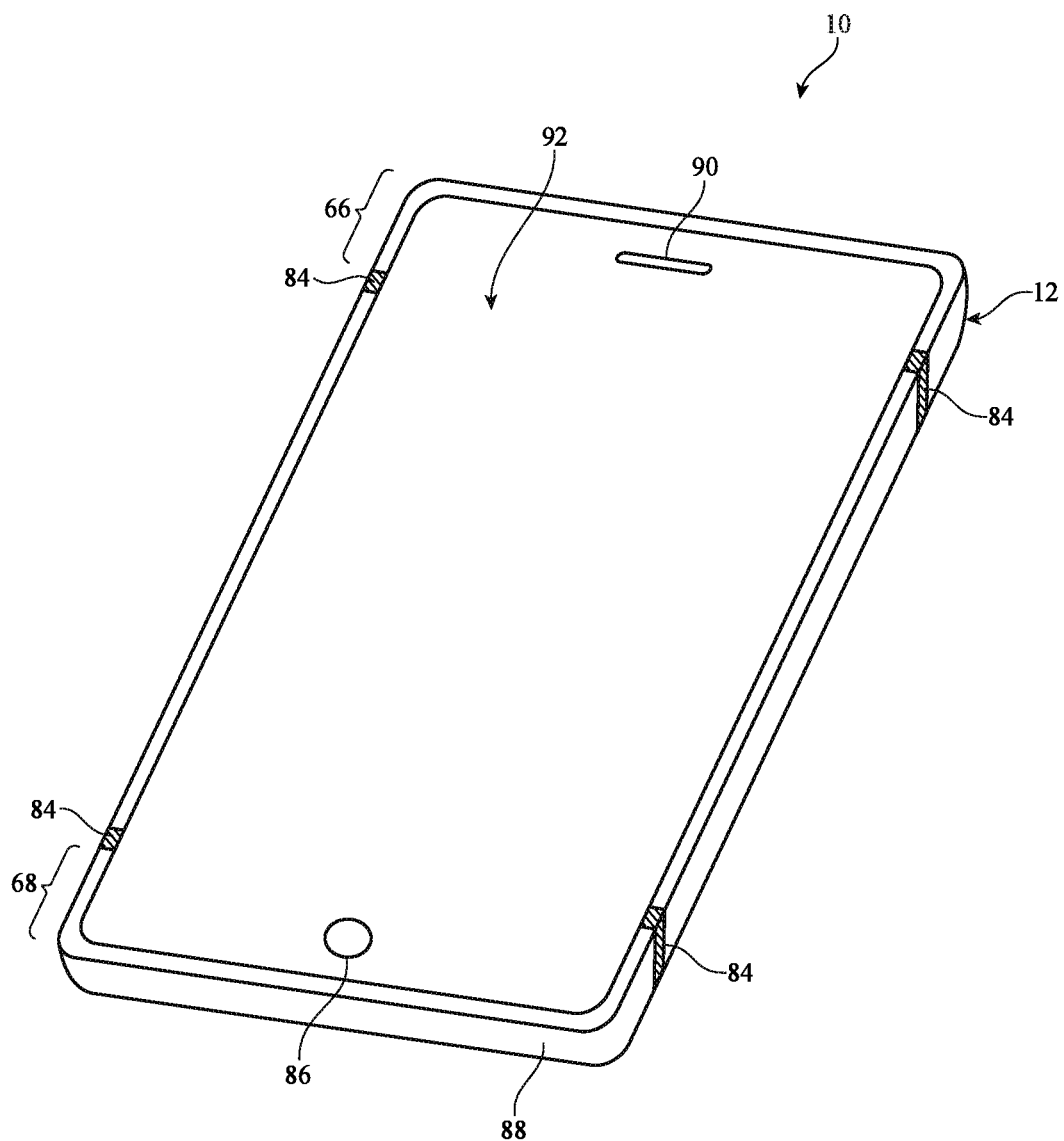
FIG. 5 is a perspective view of an illustrative electronic device in accordance with an embodiment.

FIG. 5 is a perspective view of device 10 having multiple antennas for performing MIMO communications. As shown in FIG. 5, device 10 may, if desired, have a display such as display 92. Display 92 may be mounted on the front face of device 10. Display 92 may be a touch screen that incorporates capacitive touch electrodes or may be insensitive to touch.

Display 92 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 92 or the outermost layer of display 92 may be formed from a color filter layer, thin-film transistor layer, or other display layer. Buttons such as button 86 may pass through openings in the cover layer or may be formed under the cover layer if desired. The cover layer may include openings such as an opening for speaker port 90 if desired.

Housing 12 may include peripheral housing structures such as structures 88. Structures 88 may run around the periphery of device 10 and display 92. In configurations in which device 10 and display 92 have a rectangular shape with four edges, structures 88 may be implemented using peripheral housing structures that have a rectangular ring shape with four corresponding edges (as an example). Peripheral structures 88 or part of peripheral structures 88 may serve as a bezel for display 92 (e.g., a cosmetic trim that surrounds all four sides of display 92 and/or that helps hold display 92 to device 10). Peripheral structures 88 may also, if desired, form sidewall structures for device 10 (e.g., by forming a metal band with vertical sidewalls, curved sidewalls, etc.).

Peripheral housing structures 88 may be formed of a conductive material such as metal and may therefore sometimes be referred to as peripheral conductive housing structures, conductive housing structures, peripheral metal structures, or a peripheral conductive housing member (as examples). Peripheral housing structures 88 may be formed from a metal such as stainless steel, aluminum, or other suitable materials. One, two, or more than two separate structures may be used in forming peripheral housing structures 88.

It is not necessary for peripheral housing structures 88 to have a uniform cross-section. For example, the top portion of peripheral housing structures 88 may, if desired, have an inwardly protruding lip that helps hold display 92 in place. The bottom portion of peripheral housing structures 88 may also have an enlarged lip (e.g., in the plane of the rear surface of device 10). Peripheral housing structures 88 may have substantially straight vertical sidewalls, may have sidewalls that are curved, or may have other suitable shapes. In some configurations (e.g., when peripheral housing structures 88 serve as a bezel for display 92), peripheral housing structures 88 may run around the lip of housing 12 (i.e., peripheral housing structures 88 may cover only the edge of housing 12 that surrounds display 92 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 92. In configurations for device 10 in which the rear surface of housing 12 is formed from metal, it may be desirable to form parts of peripheral conductive housing structures 88 as integral portions of the housing structures forming the rear surface of housing 12. For example, a rear housing wall of device 10 may be formed from a planar metal structure and portions of peripheral housing structures 88 on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions. Peripheral conductive housing structures 88 and/or the conductive rear wall of housing 12 may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers of dielectric such as glass, ceramic, plastic, or other structures that form the exterior surfaces of device 10 and serve to hide structures 88 from view of the user).

Display 92 may have an array of pixels that form an active area that displays images for a user of device 10. An inactive border region may run along one or more of the peripheral edges of active area if desired. Display 92 may include conductive structures such as an array of capacitive electrodes for a touch sensor, conductive lines for addressing pixels, driver circuits, etc.

Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 88 or other sheet metal parts that provide housing 12 with structural support). Device 10 may also include conductive structures such as printed circuit boards, components mounted on printed circuit boards, and other internal conductive structures. These conductive structures, which may be used in forming a ground plane in device 10, may be located in the center of housing 12, may extend under inactive or active areas display 92, etc.

In regions 66 and 68, openings may be formed within the conductive structures of device 10 (e.g., between peripheral conductive housing structures 88 and opposing conductive ground structures such as conductive housing midplate or rear housing wall structures, a printed circuit board, and conductive electrical components in display 92 and device 10). These openings, which may sometimes be referred to as gaps, may be filled with air, plastic, and other dielectrics and may be used in forming slot antenna resonating elements for one or more antennas in device 10.

Conductive housing structures and other conductive structures in device 10 such as a midplate, traces on a printed circuit board, display 92, and conductive electronic components may serve as a ground plane for the antennas in device 10. The openings in regions 66 and 68 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 66 and 68. If desired, the ground plane that is under display 92 and/or other metal structures in device 10 may have portions that extend into parts of the ends of device 10 (e.g., the ground may extend towards the dielectric-filled openings in regions 66 and 68), thereby narrowing the slots in regions 66 and 68. In configurations for device 10 with narrow U-shaped openings or other openings that run along the edges of device 10, the ground plane of device 10 can be enlarged to accommodate additional electrical components (integrated circuits, sensors, etc.)

Antennas 40 in device 10 may be located at opposing first and second ends of an elongated device housing 12 (e.g., at ends 66 and 68 of device 10 as shown in FIGS. 3 and 5), along one or more edges of a device housing, in the center of a device housing, in other suitable locations, or in one or more of these locations. The arrangement of FIG. 5 is merely illustrative.

Portions of peripheral housing structures 88 may be provided with peripheral gap structures. For example, peripheral conductive housing structures 88 may be provided with one or more gaps such as gaps 84, as shown in FIG. 5. The gaps in peripheral housing structures 88 may be filled with dielectric such as polymer, ceramic, glass, air, other dielectric materials, or combinations of these materials. Gaps 84 may divide peripheral housing structures 88 into one or more peripheral conductive segments. There may be, for example, two peripheral conductive segments in peripheral housing structures 88 (e.g., in an arrangement with two of gaps 84), three peripheral conductive segments (e.g., in an arrangement with three of gaps 84), four peripheral conductive segments (e.g., in an arrangement with four gaps 84, etc.). The segments of peripheral conductive housing structures 88 that are formed in this way may form parts of antennas 40 in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 88 and may form antenna slots, gaps 84, and other structures in device 10. Polymer or other dielectric may fill these grooves and other housing openings. In some situations, housing openings that form antenna slots and other structure may be filled with a dielectric such as air.

In a typical scenario, device 10 may have upper and lower antennas (as an example). An upper antenna such as antennas 40-1, 40-2, and 40U of FIG. 3 may, for example, be formed at the upper end of device 10 in region 66. A lower antenna may such as antennas 40-3, 40-4, and 40L of FIG. 3 may, for example, be formed at the lower end of device 10 in region 68. The antennas may be used separately to cover identical communications bands, overlapping communications bands, or separate communications bands. For example, the antennas may be used to implement a MIMO antenna scheme (e.g., a 2×MIMO scheme and/or a 4×MIMO scheme) in which two or more of the antennas cover the same frequencies.

When forming antennas such as antennas 40-1, 40-2, 40-3, and 40-4 for communicating using a MIMO scheme, care should be taken to ensure that antennas operating at the same frequencies are sufficiently isolated from each other. For example, in scenarios where portions of housing 12 are used to form portions of antennas 40-1, 40-2, 40-3, and 40-4, if care is not taken, it can be difficult to ensure that antennas operating at the same frequencies have satisfactory electromagnetic isolation from each other. Insufficient isolation may decrease the overall antenna efficiency for one or more antennas 40, may reduce the overall data throughput, may introduce errors into transmitted and received data, and may result in a wireless connection with external communications equipment being dropped, as examples.

Figure 6:
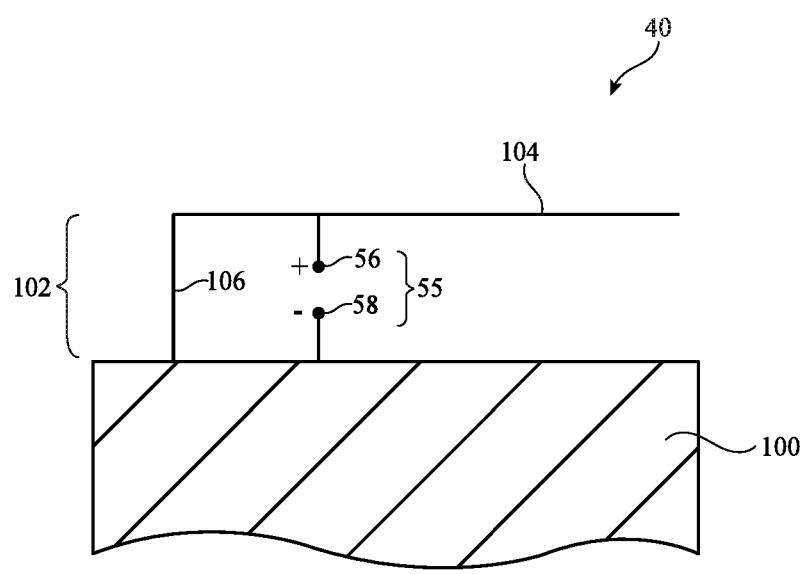
FIG. 6 is a schematic diagram of an illustrative inverted-F antenna in accordance with an embodiment.

Antennas 40 in device 10 may be formed using any desired antenna type. For example, an antenna 40 may include an antenna with a resonating element that is formed from loop antenna structures, patch antenna structures, inverted-F antenna structures, slot antenna structures, planar inverted-F antenna structures, helical antenna structures, monopole antenna structures, dipole antenna structures, hybrids of these designs, etc. FIG. 6 is a diagram of illustrative inverted-F antenna structures that may be used in implementing an antenna 40 for device 10.

As shown in FIG. 6, antenna 40 may include inverted-F antenna resonating element 102 and antenna ground (ground plane) 100. Antenna resonating element 102 may have a main resonating element arm such as arm 104. The length of arm 104 and/or portions of arm 104 may be selected so that antenna 40 resonates at desired operating frequencies. For example, the length of arm 104 may be a quarter of a wavelength at a desired operating frequency for antenna 40. Antenna 40 may also exhibit resonances at harmonic frequencies.

Main resonating element arm 104 may be coupled to ground 100 by return path 106. An inductor or other component may be interposed in path 106 and/or tunable components 60 (FIG. 2) may be interposed in path 106. If desired, tunable components 60 may be coupled in parallel with path 106 between arm 104 and ground 100. Additional return paths 106 may be coupled between arm 108 and ground 100 if desired.

Antenna 40 may be fed using one or more antenna feeds. For example, antenna 40 may be fed using antenna feed 55. Antenna feed 55 may include positive antenna feed terminal 56 and ground antenna feed terminal 58 and may run in parallel to return path 106 between arm 104 and ground 100. If desired, inverted-F antennas such as illustrative antenna 40 of FIG. 6 may have more than one resonating arm branch (e.g., to create multiple frequency resonances to support operations in multiple communications bands) or may have other antenna structures (e.g., parasitic antenna resonating elements, tunable components to support antenna tuning, etc.). For example, arm 104 may have left and right branches that extend outwardly from feed 55 and return path 106. Multiple feeds may be used to feed antennas such as antenna 40.

Figure 7:
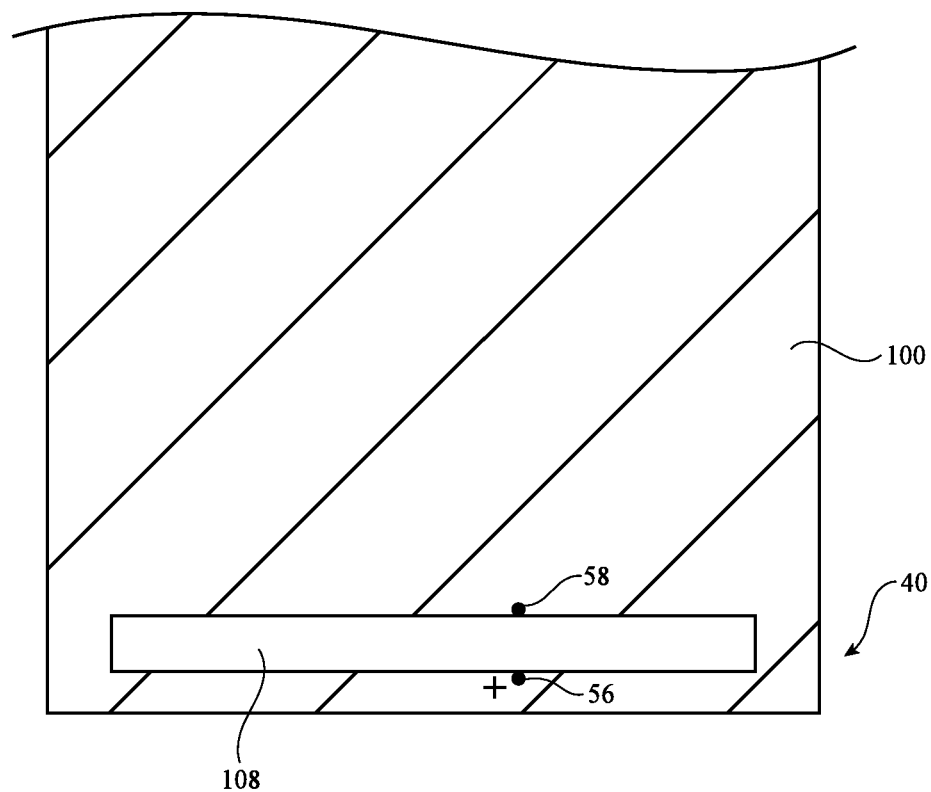
FIG. 7 is a schematic diagram of an illustrative slot antenna in accordance with an embodiment.

Antenna 40 may be a hybrid antenna that includes one or more slot antenna resonating elements. As shown in FIG. 7, for example, antenna 40 may be based on a slot antenna configuration having an opening such as slot 108 that is formed within conductive structures such as antenna ground 100. Slot 108 may be filled with air, plastic, and/or other dielectric. The shape of slot 108 may be straight or may have one or more bends (i.e., slot 108 may have an elongated shape following a meandering path). Feed terminals 56 and 58 may, for example, be located on opposing sides of slot 108 (e.g., on opposing long sides). Slot-based antenna resonating elements such as slot antenna resonating element 108 of FIG. 7 may give rise to an antenna resonance at frequencies in which the wavelength of the antenna signals is equal to the perimeter of the slot. In narrow slots, the resonant frequency of a slot antenna resonating element is associated with signal frequencies at which the slot length is equal to a half of a wavelength.

Slot antenna frequency response can be tuned using one or more tuning components (e.g., components 60 of FIG. 2). These components may have terminals that are coupled to opposing sides of the slot (i.e., the tunable components may bridge the slot). If desired, tunable components may have terminals that are coupled to respective locations along the length of one of the sides of slot 108. Combinations of these arrangements may also be used. If desired, antenna 40 may be a hybrid slot-inverted-F antenna that includes resonating elements of the type shown in both FIG. 6 and FIG. 7 (e.g., having resonances given by both a resonating element arm such as arm 104 of FIG. 6 and a slot such as slot 108 of FIG. 7).

Figure 8:
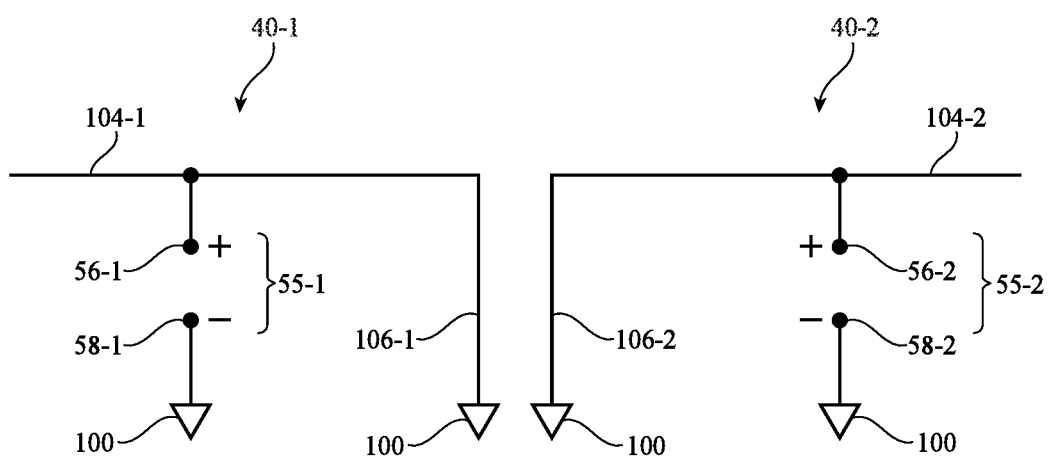
FIG. 8 is a schematic diagram of illustrative first and second antennas having adjacent return paths for performing MIMO communications in accordance with an embodiment.

While the examples of FIGS. 6 and 7 show only a single antenna 40, multiple antennas 40 may be formed from these structures within device 10. FIG. 8 is a schematic diagram of a pair of adjacent antennas such as antennas 40-1 and 40-2 of FIG. 3 that may be used for performing MIMO operations.

As shown in FIG. 8, antennas 40-1 and 40-2 may include inverted-F antenna structures (e.g., as shown in FIG. 6). Antenna 40-1 may include a resonating element arm 104-1 coupled to ground 100 by short path 106-1. Antenna 40-1 may be fed using a first antenna feed 55-1. Antenna feed 55-1 may have a first feed terminal 56-1 coupled to resonating element arm 104-1 and a second feed terminal 58-1 coupled to ground 100. Antenna 40-2 may include a resonating element arm 104-2 coupled to ground 100 by short path 106-2. Antenna 40-2 may be fed using a second antenna feed 55-2 having a first feed terminal 56-2 coupled to resonating element arm 104-2 and a second feed terminal 58-2 coupled to ground 100.

In the example of FIG. 8, return path 106-1 of antenna 40-1 may be interposed between the location of feed 55-1 and return path 106-2 of antenna 40-2. Similarly, return path 106-2 of antenna 40-2 may be interposed between return path 106-1 of antenna 40-1 and feed 55-2. Radio-frequency signals may be conveyed to and from antenna 40-1 over feed 55-1 and may be conveyed to and from antenna 40-2 over feed 55-2. Corresponding antenna currents for antenna 40-1 may flow through main resonating element arm 104-1 of antenna 40-1 and are shorted to ground 100 over path 106-1. Similarly, antenna currents for antenna 40-2 may flow through main resonating element arm 104-2 of antenna 40-2 and are shorted to ground 100 over path 106-2.

When performing MIMO operations (e.g., 4×MIMO operations) within the same frequency band (e.g., within midband MB or high band HB), if care is not taken, antenna currents from antenna 40-1 can electromagnetically interact with antenna currents from antenna 40-2, thereby deteriorating radio-frequency performance by both antennas. However, by forming short path 106-1 adjacent to antenna 106-2, the magnetic fields of antenna currents from both antennas 40-1 and 40-2 may cancel out, serving to effectively isolate antenna 40-1 from 40-2. While arms 104-1 and 104-2 are shown as being electrically separated in the electrical schematic of FIG. 8 (e.g., due to the electromagnetic isolation between arms 104-1 and 104-2), in one suitable arrangement, arms 104-1 and 104-2 may be formed from a single continuous conductor (e.g., a single housing wall 88 of device 10) and/or short paths 106-1 and 106-2 may be formed from a single continuous conductor between arms 104-1 and 104-2 and ground 100 (e.g., without affecting the isolation between antennas 40-1 and 40-2). While the example of FIG. 8 describes adjacent antennas 40-1 and 40-2, similar antenna structures may be used in forming antennas 40-2 and 40-3 of FIG. 3 (e.g., where antenna 40-4 replaces antenna 40-1 and antenna 40-3 replaces antenna 40-2 in FIG. 8)

Figure 9:
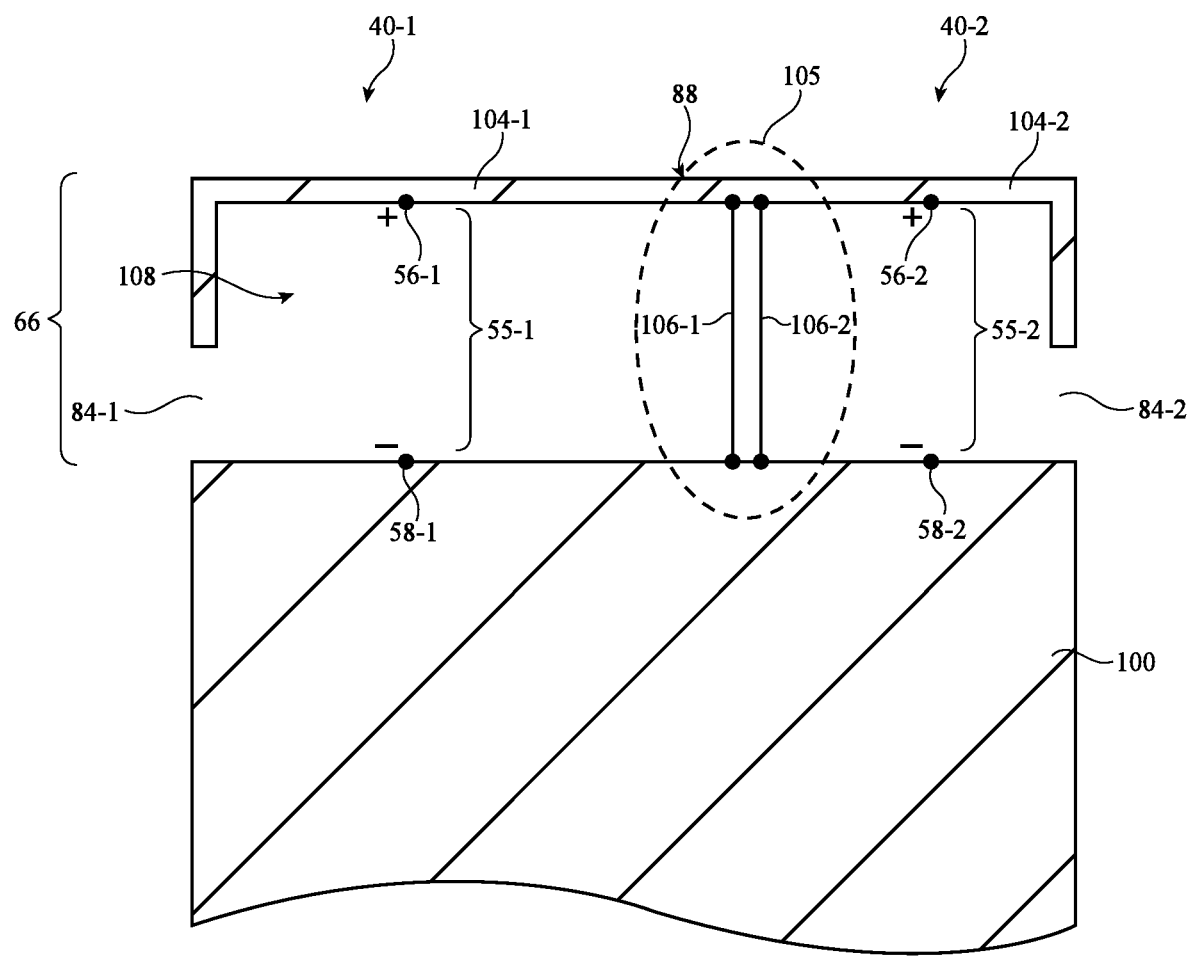
FIG. 9 is a diagram of illustrative first and second antennas having adjacent return paths for performing MIMO communications and having resonating elements formed from a continuous conductive electronic device housing wall in accordance with an embodiment.

If desired, an opening between arms 104-1 and 104-2 and ground 100 may contribute a slot antenna resonance to antennas 40-1 and 40-2 (e.g., antennas 40-1 and 40-2 may be hybrid slot-inverted-F antennas including resonating elements of the types shown in both FIGS. 6 and 7). FIG. 9 is a diagram showing how antennas 40-1 and 40-2 may include both slot and inverted-F antenna structures and may be formed from portions of device housing 12.

As shown in FIG. 9, resonating element arm 104-1 of antenna 40-1 and resonating element arm 104-2 of antenna 40-2 may be formed from a segment of peripheral conductive housing structures 88. The segment of peripheral conductive housing structures 88 forming resonating element arms 104-1 and 104-2 may extend between a first dielectric gap 84-1 at a first side of device 10 and a second dielectric gap 84-2 at an opposing second side of device 10. For example, the segment of structures 88 may include a peripheral conductive wall (e.g., sidewall) of device 10. Resonating element arm 104-1 may be formed from a first portion of the peripheral conductive wall and resonating element arm 104-2 may be formed from a second portion of the peripheral conductive wall that extends from an end of the first portion (e.g., the first and second portions may be directly connected and formed from the same conductive sidewall of device 10).

The segment of peripheral conductive housing structures 88 (e.g., resonating element arms 104-1 and 104-2) may be separated from ground 100 by slot 108. Slot 108 may be formed from an elongated opening extending from gap 84-1 to gap 84-2 (e.g., the ends of slot 108, which may sometimes be referred to as open ends, may be formed by gaps 84-1 and 84-2). Slot 108 may have an elongated shape having any suitable length (e.g., about 4-20 cm, more than 2 cm, more than 4 cm, more than 8 cm, more than 12 cm, less than 25 cm, less than 10 cm, etc.) and any suitable width (e.g., approximately 2 mm, less than 2 mm, less than 3 mm, less than 4 mm, 1-3 mm, etc.). Slot 108 may be filled with dielectric such as air or plastic. For example, plastic may be inserted into portions of slot 108 and this plastic may be flush with the outside of housing 12. Ground 100 may be formed from a conductive layer within device 10, a midplate member for device 10, a rear wall of housing 12, portions of peripheral conductive structures 88, and/or any other desired conductive structures within device 10.

Antenna feed 55-1 for antenna 40-1 may include a first feed terminal 56-1 coupled to peripheral structures 88 and a second feed terminal 58-1 coupled to ground 100. Antenna feed 55-2 may include a first feed terminal 56-2 coupled to peripheral structures 88 and a second feed terminal 58-2 coupled to ground 100. Feed 55-1 may be fed by transceiver circuitry 48-1 using transmission line 50-1 (FIG. 3) and feed 55-2 may be fed by transceiver circuitry 48-2 using transmission line 50-2, for example.

Return path 106-1 for antenna 40-1 may be coupled between peripheral structures 88 and ground 100. Return path 106-2 for antenna 40-2 may be coupled between peripheral structures 88 and ground 100 adjacent to return path 106-1. In one suitable arrangement, return paths 106-1 and 106-2 may be formed from the same conductive structure (e.g., an elongated conductive strip, a conductive wire, conductive spring structures, a metal trace on a rigid or flexible printed circuit, a metal screw or fastener, etc.) coupled between segment 88 and ground 100.

Portions of slot 108 may contribute slot antenna resonances to antennas 40-1 and/or 40-2. For example, a portion of slot 108 between arm 104-1 and ground 100 (e.g., between feed 55-1 and gap 84-1) may contribute a resonance in high band HB for antenna 40-1 and a portion of slot 108 between arm 104-2 and ground 100 may contribute a high band resonance HB for antenna 40-2.

In the example of FIG. 9, antenna 40-1 occupies a greater volume than antenna 40-2 and arm 104-1 is longer than arm 104-2. The length of antenna resonating element arms 104 may be selected so that antennas 40-1 and 40-2 resonate at desired frequencies. For example, the resonance of antenna 40-1 in midband MB may be associated with the distance along peripheral conductive structures 88 between feed terminal 56-1 and gap 14-1. The resonance of antenna 40-1 in low band LB may be associated with the distance along peripheral conductive structures 88 between feed terminal 56-1 and return path 106-1. Arm 104-2 of antenna 40-2 may be too short to support a frequency in low band LB. However, the resonance of antenna 40-2 in midband MB may be associated with the distance along peripheral conductive structures 88 between return path 106-2 and gap 84-2, for example.

The example of FIG. 9 is merely illustrative. If desired, adjustable components (e.g., tuning components 60 of FIG. 2) such as switches, capacitors, resistors, and/or inductors may be coupled between different locations along peripheral structures 88 and ground 100. The adjustable components may, for example, tune the midband and/or low band resonance of antennas 40-1 and 40-2 to different desired frequencies. Peripheral conductive structures 88 may have any desired shape following the periphery of device 10.

When configured in this way, both antennas 40-1 and 40-2 may support communications in midband MB and high band HB whereas antenna 40-1 also supports communications in low band LB. Antennas 40-1 and 40-2 may therefore both perform communications using a MIMO scheme in midband MB and/or high band HB (e.g., a 2×MIMO scheme in midband MB and/or high band HB using only antennas 40-1 and 40-2 or a 4×MIMO scheme in midband MB and/or high band HB together with antennas 40-3 and 40-4 of FIG. 3). When performing communications in this way at the same frequency, antenna currents in antenna 40-1 may be susceptible to interference with antenna currents 40-2. However, the arrangement of antenna structures within antennas 40-1 and 40-2 may configure antennas 40-1 and 40-2 to be sufficiently isolated from one another, even though resonating element arms 104-1 and 104-2 are both formed from the same continuous piece of conductive material (i.e., peripheral structures 88). At the same time, antenna 40-1 may, if desired, perform 2×MIMO operations in low band LB with antenna 40-4 (FIG. 3).

Figure 10:
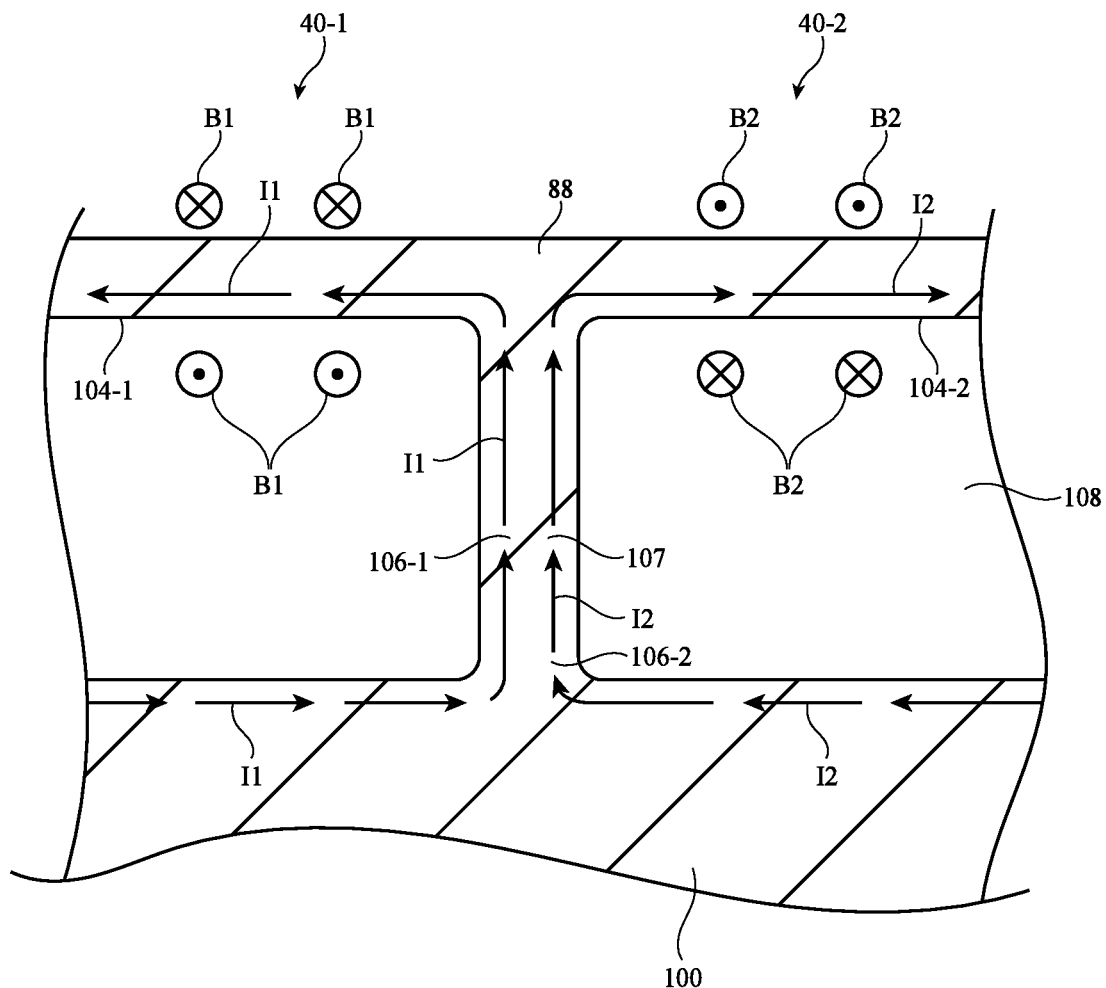
FIG. 10 is a diagram showing how illustrative antennas of the type shown in FIGS. 8 and 9 may be electromagnetically isolated from each other while performing MIMO communications in accordance with an embodiment.

FIG. 10 is a diagram of return paths 106-1 and 106-2 (e.g., within dashed region 105 of FIG. 9) showing how antennas 40-1 and 40-2 may be sufficiently isolated despite having resonating element arms 104-1 and 104-2 formed from a continuous conductor. As shown in FIG. 10, radio-frequency antenna currents I1 may flow through ground plane 100, over return path 106-1, and over arm 104-1 between the feed terminals of antenna 40-1. Similarly, radio-frequency antenna currents I2 may flow through ground plane 100, over return path 106-2, and over arm 104-2 between the feed terminals of antenna 40-2.

Antenna currents I1 for antenna 40-1 may produce a magnetic field B1 that points into the page of FIG. 10 at the exterior of peripheral housing structures 88 and out of the page between structures 88 and ground plane 100 (e.g., at the interior of device 10). At the same time, antenna currents I2 for antenna 40-2 may produce a magnetic field B2 that points out of the page at the exterior of peripheral housing structures 88 and into the page between structures 88 and ground plane 100. In this way, magnetic field B1 outside of structures 88 may cancel out with magnetic field B2 outside of structures 88 and magnetic field B1 between structures 88 and ground 100 may cancel out with magnetic field B2 between structures 88 and ground 100. This may result in the magnetic field produced by current I1 canceling out with the magnetic field produced by current I2 at the location of return paths 106-1 and 106-2, thereby serving to electromagnetically isolate antenna 40-1 from antenna 40-2, even though arms 104-1 and 104-2 are both formed from a continuous structure 88. Forming both arms 104-1 and 104-2 from a continuous conductor (e.g., without any gaps such as gaps 84) may, for example, enhance the aesthetic appearance of device 10 to a user and/or may enhance the structural (mechanical) integrity of device 10 relative to scenarios where gaps are used to isolate antenna 40-1 and 40-2. In addition, as shown in FIG. 10, return paths 106-1 and 106-2 may both be formed using the same conductive structure 107 (e.g., a conductive trace on a substrate, a metal wire, a conductive pin, a solder joint, weld, etc.) extending between peripheral structures 88 and ground 100 without affecting the isolation between antennas 40-1 and 40-2.

While the example of FIGS. 8-10 describes adjacent antennas 40-1 and 40-2, similar antenna structures may be used in forming antennas 40-2 and 40-3 at lower end 68 of device 10 as shown in FIG. 3 (e.g., where antenna 40-4 replaces antenna 40-1 and antenna 40-3 replaces antenna 40-2 in FIG. 10). While the arrangement of FIGS. 8-10 may provide a satisfactory amount of isolation between antennas 40-1 and 40-2, in another suitable arrangement, antennas 40-1 and 40-2 may be further isolated by mechanically separating arm 104-1 of antenna 40-1 from arm 104-2 of antenna 40-2.

Figure 11:
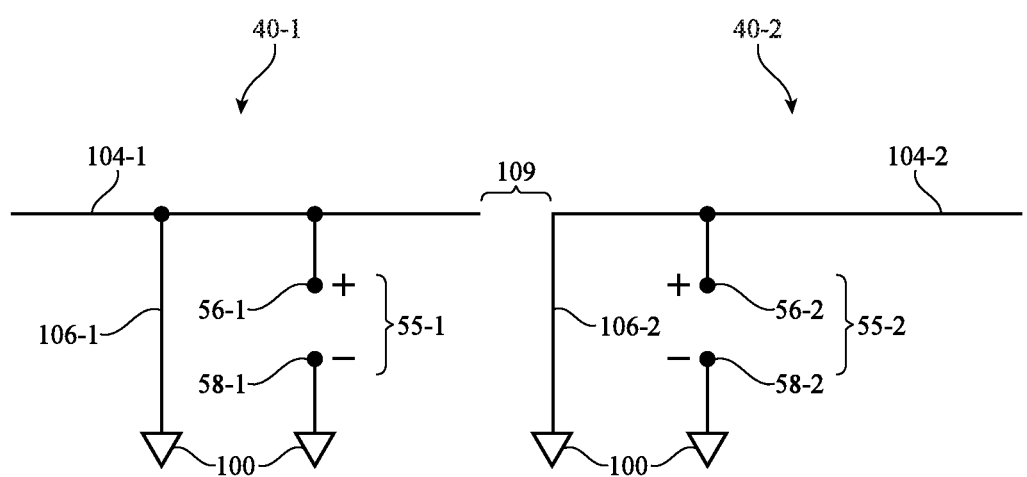
FIG. 11 is a schematic diagram of illustrative first and second antennas having mechanically separated resonating elements for performing MIMO communications in accordance with an embodiment.

FIG. 11 is a schematic diagram of a pair of adjacent antennas such as antennas 40-1 and 40-2 of FIG. 3 having mechanically separated (isolated) resonating elements. As shown in FIG. 11, resonating element arm 104-1 of antenna 40-1 may be mechanically separated from resonating element arm 104-2 of antenna 40-2 by gap 109. Gap 109 may, for example, be formed from a gap 84 in peripheral conductive structures 88. Feed 55-1 of antenna 40-1 may be interposed between gap 109 and return path 106-1. Return path 106-1 may be coupled to resonating element arm 104-1 at a location that is interposed between the end of arm 104-1 opposing gap 109 and terminal 56-1 of feed 55-1.

Return path 106-2 of antenna 40-2 may be coupled between an end of arm 104-2 that is adjacent to gap 109 and ground 100. This is merely illustrative. If desired, return path 106-2 may be coupled between ground 100 and any desired location on arm 104-2 that is between feed terminal 56-2 and gap 109. Feed 55-2 of antenna 40-2 may be interposed between return path 106-2 and the end of arm 104-2 that opposes gap 109. When configured in this way, gap 109 may both mechanically separate arm 104-1 from arm 104-2 and serve to electromagnetically isolate antenna 40-1 from antenna 40-2 (e.g., by preventing the electromagnetic fields from antenna currents handled by feed 55-1 from significantly interacting with the electromagnetic fields from antenna currents handled by feed 55-2).

Figure 12:
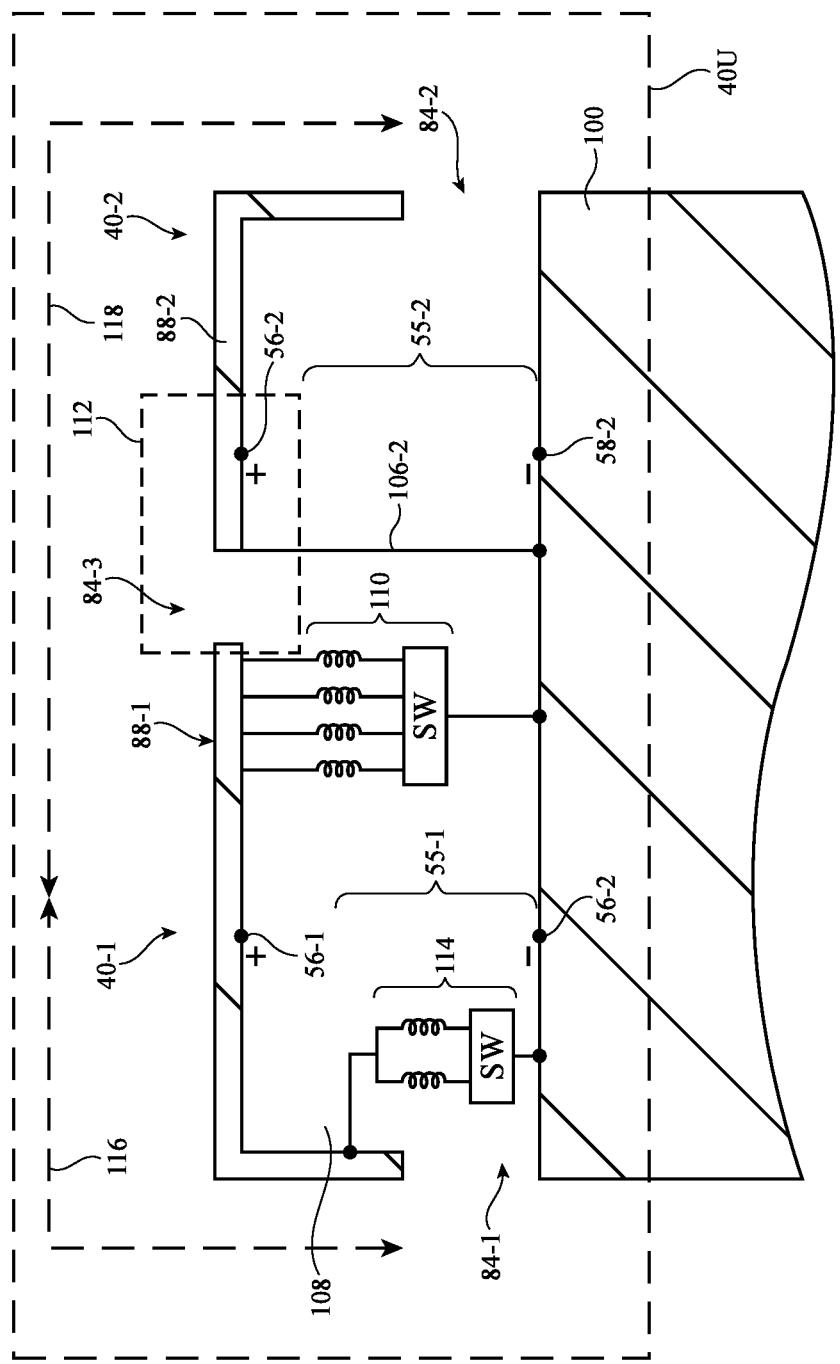
FIG. 12 is a diagram of illustrative first and second antennas having mechanically separated resonating elements formed from a conductive electronic device housing wall and having switching circuitry for switching between first and second MIMO modes in accordance with an embodiment.

FIG. 12 is a diagram showing how antennas 40-1 and 40-2 may be formed from slot and inverted-F antenna structures and from mechanically separated portions of device housing 12. Antennas 40-1 and 40-2 may be hybrid slot-inverted-F antennas that include resonating elements of the type shown in both FIGS. 6 and 7.

As shown in FIG. 12, an opening 84 (FIG. 5) such as opening 84-3 may separate peripheral conductive housing structures 88 into a first segment 88-1 and a second segment 88-1. Resonating element arm 104-1 of antenna 40-1 may be formed from segment 88-1. Resonating element arm 104-2 of antenna 40-2 may be formed from segment 88-2.

Segment 88-1 may extend between gap 84-3 and gap 84-1. Segment 88-2 may extend between gap 84-3 and gap 84-2. Feed 55-1 of antenna 40-1 may be coupled across slot 108 between segment 88-1 and ground 100 whereas feed 55-2 of antenna 40-2 is coupled across slot 108 between segment 88-2 and ground 100. A portion of slot 108 between segment 88-1 and ground 100 may contribute a slot antenna resonance such as a resonance in high band HB for antenna 40-1. A portion of slot 108 between segment 88-2 and ground 100 may contribute a slot antenna resonance such as a resonance in high band HB for antenna 40-2.

Return paths such as paths 106-1 and 106-2 of FIG. 11 may be formed by fixed conductive paths bridging slot 108 or by adjustable components such as components 110 and 114 (e.g., adjustable components 60 of FIG. 2) bridging slot 108. Adjustable components 110 and 114 may both be coupled between segment 88-1 and ground 100 across slot 108 and may form adjustable return paths (e.g., return path 106-1 of FIG. 11) for antenna 40-1. Adjustable components 114 and 110 may sometimes be referred to herein as tuning components, tunable components, tunable circuits, or adjustable tuning components. Return path 106-2 may be coupled between segment 88-2 and ground 100. Return path 106-2 may include adjustable components such as switches or may be free from adjustable components. Antenna feed terminal 56-2 of antenna 40-2 may be coupled to segment 88-2 at a location that is interposed between return path 106-2 and gap 84-2.

Adjustable component 114 may bridge slot 108 at a first location along slot 108. For example, adjustable component 114 may be coupled to segment 88-1 at a location that is interposed between feed terminal 56-1 and gap 84-1. Adjustable component 110 may bridge slot 108 at a second location along slot 108. For example, adjustable component 110 may be coupled to segment 88-1 at one or more locations that are interposed between gap 84-3 and feed terminal 56-1.

Components 110 and 114 may include switches (SW) coupled to fixed components such as inductors for providing adjustable amounts of inductance or an open circuit between ground 100 and segment 88-1. The switches in component 114 may include, for example, a single-pole double-throw (SP2T) switch and two inductors. The switches in component 110 may include, for example, a single-pole four-throw (SP4T) switch coupled to four inductors. This example is merely illustrative and, in general, components 110 and 114 may include other components such as adjustable return path switches, switches coupled to capacitors, or any other desired components. Components 110 and 114 may include any desired number of inductors. If desired, components 110 and/or 114 may include paths without any inductors that may be selectively coupled between segment 88-1 and ground 100. Components 110 and 114 (e.g., the states of the corresponding switches) may be controlled by control circuitry 28 (FIG. 1), for example. Components 110 and 114 may, for example, form return paths for antenna 40-1 (e.g., one or more return paths 106-1 as shown in FIG. 11).

The length of antenna resonating element arms 104 may be selected so that antennas 40-1 and 40-2 resonate at desired frequencies. For example, the resonance of antenna 40-1 in midband MB may be associated with the distance along segment 88-1 between component 114 and gap 84-1. The resonance of antenna 40-1 in low band LB may be associated with the distance along segment 88-1 between component 114 and gap 84-3, for example. The resonance of antenna 40-2 in midband MB may be associated with the distance along segment 88-2 between return path 106-2 and gap 84-2, for example. Adjustable components such as components 60 of FIG. 2 may bridge slot 108 between segment 88-2 and ground 100 if desired.

Control circuitry 28 (FIG. 1) may adjust components 114 and 110 to tune the frequency response of antenna 40-1 if desired. For example, control circuitry 28 may adjust component 114 (e.g., by switching one of the corresponding inductors into use) to tune the resonant frequency of antenna 40-1 within midband MB. Control circuitry 28 may adjust component 110 to tune the resonant frequency of antenna 40-1 within low band LB.

Antennas 40-1 and 40-2 may perform communications using a MIMO scheme in midband MB and/or high band HB. The mechanical separation between arms 104-1 and 104-2 provided by gap 84-3 may serve to isolate antenna 40-1 from antenna 40-2 when antennas 40 operate at the same frequency (e.g., while performing communications using a MIMO scheme). While the example of FIGS. 11 and 12 describe adjacent antennas 40-1 and 40-2, similar antenna structures may be used in forming antennas 40-2 and 40-3 at lower end 68 of device 10 as shown in FIG. 3 (e.g., where antenna 40-4 replaces antenna 40-1 and antenna 40-3 replaces antenna 40-2 in FIGS. 11 and 12).

Antennas 40-1 and 40-2 as shown in FIG. 12 may, if desired, perform communications using a 2×MIMO scheme in midband MB and/or high band HB (e.g., without MIMO contributions from antennas 40-3 and 40-4) or a 4×MIMO scheme with antennas 40-3 and 40-4 in midband MB and/or high band HB (e.g., as shown in FIG. 4). When performing MIMO operations in midband MB and/or high band HB, antennas 40-1, 40-2, 40-3, and 40-4 may transmit and/or receive independent data streams at the same frequencies (e.g., in midband MB and/or high band HB). The presence of gap 84-3 may ensure that antenna 40-1 is sufficiently isolated from antenna 40-2 despite both antennas operating at the same frequency. At the same time, antenna 40-1 may, if desired, perform 2×MIMO operations in low band LB with antenna 40-4 (FIG. 3).

In some scenarios, the high data throughput achievable using a 4×MIMO scheme may not be necessary for communications between device 10 and the external communications equipment. In these scenarios, device 10 may perform 2×MIMO communications in which two antennas are used for performing communications at the same frequencies (e.g., without performing any 4×MIMO communications). In order to maximize isolation between the two antennas in these scenarios, the two antennas for performing the 2×MIMO operations may be located at opposing sides (e.g., sides 66 and 68) of device 10. In order to further increase the antenna efficiency of the two antennas in these scenarios (e.g., by utilizing as much antenna volume as possible), antennas 40-1, 40-2, 40-3, and 40-4 may be configured to form upper antenna 40U and lower antenna 40L (FIG. 3) for performing the 2×MIMO operations.

As shown in FIG. 12, if desired, antennas 40-1 and 40-2 may include switching circuitry that is controlled by control circuitry 28 (FIG. 1) to place antennas 40-1 and 40-2 in a selected one of a first operating mode and a second operating mode. In the first operating mode (sometimes referred to herein as a 4×MIMO mode or first MIMO mode), antennas 40-1 and 40-2 are isolated by gap 84-3 and convey separate data streams at the same frequency (e.g., so that antennas 40-1 and 40-2 can perform 4×MIMO operations with antennas 40-3 and 40-4). In the second operating mode (sometimes referred to herein as a 2×MIMO mode or second MIMO mode), antennas 40-1 and 40-2 are configured to form a single antenna such as upper antenna 40U (e.g., a single antenna 40 including structures from both antennas 40-1 and 40-2).

In the second operating mode, segment 88-1 may be shorted to segment 88-2, return path 106-2 may be decoupled from ground 100, and feed 55-2 may be disabled. Antenna 40U may subsequently be fed using antenna feed 55-1. The distance between feed 55-1 and gap 84-2 may support a resonance in low band LB (as shown by arrow 118) and the distance between feed 55-1 and gap 84-1 may support resonance in midband MB (as shown by arrow 116) for antenna 40U (e.g., both segments 88-1 and 88-2 may form part of a single resonating element arm 106 for antenna 40U). Slot 108 between the resonating element arm of antenna 40U and ground 110 may support a resonance in high band HB.

In this example, similar structures may be used to form antennas 40-3 and 40-4 (e.g., with antenna 40-4 replacing antenna 40-1 and antenna 40-3 replacing antenna 40-2 in FIG. 12). Antennas 40-3 and 40-4 may thereby be toggled between the first operating mode where antennas 40-3 and 40-4 independently convey two separate data streams at the same frequencies for performing 4×MIMO operations with antennas 40-1 and 40-2 and the second operating mode where antennas 40-3 and 40-4 form a single lower antenna 40L (FIG. 3). When antennas 40-1, 40-2, 40-3, and 40-4 are placed in the second operating mode to form antennas 40U and 40L, antennas 40U and 40L may perform 2×MIMO operations by both transmitting and/or receiving independent data streams at the same frequencies in low band LB, midband MB, and/or high band HB.

Figure 13:
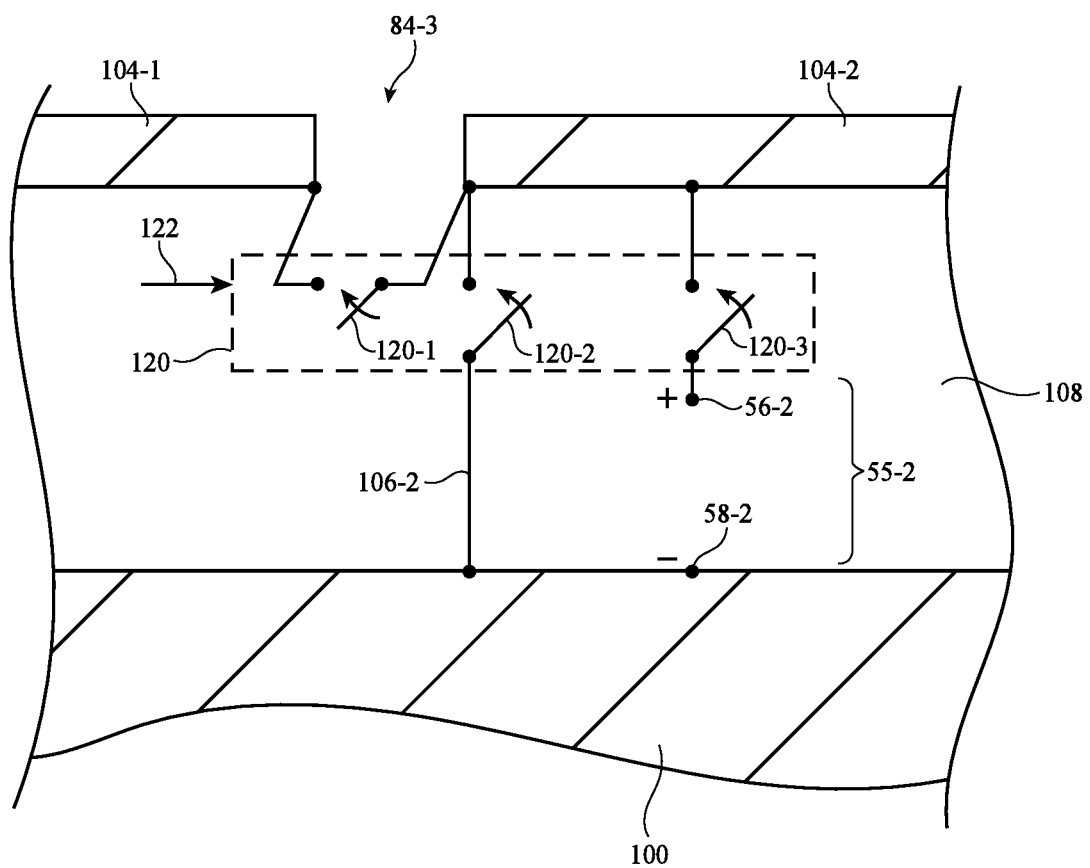
FIG. 13 is a diagram of switching circuitry that may be used to toggle antennas of the type shown in FIGS. 11 and 12 between first and second MIMO modes in accordance with an embodiment.

FIG. 13 is a diagram of switching circuitry that may be formed in device 10 for toggling antennas 40-1 and 40-2 between the first operating mode and the second operating mode (e.g., within dashed region 112 of FIG. 12). As shown in FIG. 13, switching circuitry 120 may be coupled between antenna 40-1 and antenna 40-2. The state of switching circuitry 120 may be controlled by control signals 122 received from control circuitry 28.

Switching circuitry 120 may include a first switch 120-1 coupled between resonating element arm 104-1 (segment 88-1) and resonating element arm 104-2 (segment 88-2) across gap 84-3. When switch 120-1 is closed (turned on), arm 104-1 of antenna 40-1 may be shorted to arm 104-2 of antenna 40-2 to form a single resonating element arm 106 for antenna 40U.

Switching circuitry 120 may include a second switch 120-2 interposed on return path 106-2 of antenna 40-2 (e.g., switch 106-2 may be coupled between arm 104-2 of antenna 40-2 and ground 100). When switch 120-2 is closed, arm 104-2 of antenna 40-2 may be shorted to ground 100 (e.g., for supporting a resonance in midband MB for antenna 40-2). When switch 120-2 is open, an open circuit may be formed between arm 104-2 and ground 100 (e.g., so that the resonating element arm of antenna 40U is not shorted to ground between feed 55-1 and gap 84-2).

Switching circuitry 120 may include a third switch 120-3 interposed between feed terminal 56-2 of antenna feed 55-2 and resonating element arm 104-2. When switch 120-3 is closed, feed 56-2 is coupled to arm 104-2 and radio-frequency antenna signals for antenna 40-2 may be conveyed by antenna 40-2. When switch 120-3 is open, feed 55-2 is disabled by decoupling feed terminal 56-2 from arm 104-2.

Control circuitry 28 may place switching circuitry 120 in a first state (e.g., a 4×MIMO state or first MIMO state) in which switch 120-1 is open and switches 120-2 and 120-3 are closed. When switching circuitry 120 is in the first state, antennas 40-1 and 40-2 are placed in the first operating mode. In the first operating mode, arm 104-1 of antenna 40-1 may be isolated from arm 104-2 of antenna 40-2 by gap 84-3, return path 106-2 of antenna 40-2 may be coupled between arm 104-2 and ground 100, and feed 55-2 may be active (e.g., feed terminal 56-2 may be coupled to arm 104-2). Antennas 40-1 and 40-2 may subsequently perform 4×MIMO operations by conveying separate data streams at the same frequencies as antennas 40-3 and 40-4 (FIG. 3).

Control circuitry 28 may place switching circuitry 120 in a second state (e.g., a 2×MIMO state or second MIMO state) in which switch 120-1 is closed and switches 120-2 and 120-3 are open. When switching circuitry 120 is in the second state, antennas 40-1 and 40-2 are placed in the second operating mode in which structures in antennas 40-1 and 40-2 form a single antenna 40U. In the second operating mode, arm 104-1 of antenna 40-1 may be shorted to arm 104-2 of antenna 40-2 across gap 84-3 to form the resonating element arm of antenna 40U, return path 106-2 may form an open circuit between peripheral structures 88 and ground 100, and feed 55-2 may be deactivated (e.g., feed terminal 56-2 may be decoupled from arm 104-2). Antenna 40U may subsequently perform 2×MIMO operations by conveying data streams at the same frequencies as antenna 40L (FIG. 3).

The example of FIG. 13 is merely illustrative. If desired, one or more of switches 120-1, 120-2, and 120-3 may be omitted or additional switches may be formed within switching circuitry 120. In the example of FIG. 13, switches 120-1, 120-2, and 120-3 are SP2T switches. However, in general, any desired switches may be used and the switches in switching circuitry 120 may be arranged in any desired manner between antennas 40-1 and 40-2.

Performing 2×MIMO operations (e.g., while switching circuitry 120 is in the second state) may involve a lower throughput than performing 4×MIMO operations (e.g., while switching circuitry 120 is in the first state). However, performing 2×MIMO operations may involve higher antenna efficiency than performing 4×MIMO operations (e.g., because antennas 40U and 40L are formed at opposing ends of device 10 and are therefore isolated from each other and because antennas 40U and 40L occupy larger volumes than antennas 40-1, 40-2, 40-3, or 40-4). If desired, control circuitry 28 may place antennas 40-1, 40-2, 40-3, and 40-4 in the first operating mode when the processing operations of device 10 call for relatively high data throughput (e.g., for streaming high definition video, performing computationally intensive cloud computing algorithms, etc.) and may configure antennas 40-1, 40-2, 40-3, and 40-4 to form antennas 40U and 40L in the second operating mode when the processing operations of device 10 call for relatively high antenna efficiency (e.g., when there is a low wireless link quality between device 10 and external wireless equipment).

Figure 14:
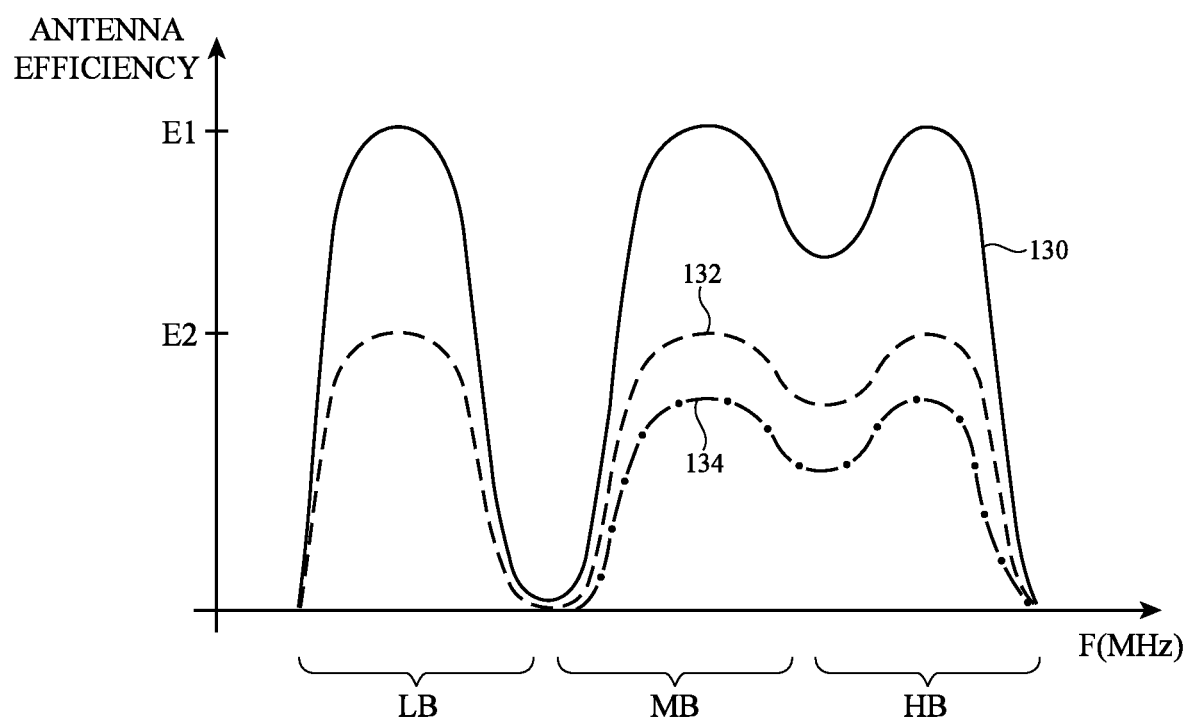
FIG. 14 is a graph of antenna performance (antenna efficiency) for illustrative antenna structures of the types shown in FIGS. 8-13 in accordance with an embodiment.

FIG. 14 is a graph in which antenna performance (antenna efficiency) has been plotted as a function of operating frequency f for antennas 40-1, 40-2, and/or 40U of FIGS. 11-13 (e.g., including switching circuitry 120). As shown in FIG. 14, curve 130 plots the antenna efficiency of antenna 40U when placed in the second operating mode (e.g., when switching circuitry 120 is placed in the second state). When operating in the second mode, antenna 40U may exhibit peak efficiencies E1 in low band LB, midband MB, and high band HB (e.g., peak efficiencies of approximately −3 dB). The peak in low band LB may be generated by a resonance of antenna 40U associated with the path length 118 of FIG. 12, the peak in midband MB may be generated by a resonance of antenna 40U associated with path length 116, and the peak in high band HB may be generated by a resonance of antenna 40U associated with a portion of slot 108 between path 116 and ground 100, for example. The frequency response of antenna 40U within low band LB may be adjusted by adjusting component 110 of FIG. 12 if desired. The frequency response of antenna 40L within midband MB may be adjusted by adjusting component 114 of FIG. 12 if desired.

Curve 132 plots the antenna efficiency of antenna 40-1 when operated in the first operating mode (e.g., when switching circuitry 120 is placed in the first state). When operating in the first operating mode, antenna 40-1 may exhibit peak efficiencies E2 in low band LB, midband MB, and high band HB that are less than efficiencies E1 associated with curve 130 (e.g., due to the decrease in isolation between each active antenna and the decrease in spatial volume for each antenna). As an example, peak efficiencies E2 may be approximately −6 dB. The peak in low band LB may be generated by a resonance of antenna 40-1 associated with the path between component 114 and gap 84-3 of FIG. 12, the peak in midband MB may be generated by a resonance of antenna 40-1 associated with the path between component 114 and gap 84-1, and the peak in high band HB may be generated by a resonance of slot 108 between segment 88-1 and ground 100, for example. The frequency response of curve 132 within low band LB may be adjusted by adjusting component 110 of FIG. 12. The frequency response of curve 130 within midband MB may be adjusted by adjusting component 114.

Curve 134 plots the antenna efficiency of antenna 40-2 when placed in the first operating mode (e.g., when switching circuitry 120 is placed in the first state). When operating in the first mode, antenna 40-2 may exhibit peak efficiencies E2 in low midband MB and high band HB. The peak in midband MB may be generated by a resonance of antenna 40-2 associated with the distance between return path 106-2 and gap 84-2 and the peak in high band HB may be generated by a resonance of slot 108 between segment 88-2 and ground 100, for example. While operating in the first mode reduces the overall antenna efficiency from E1 to E2, data throughput for wireless circuitry 34 is also greater than in the first mode than in the second mode.

When placed in the first operating mode, antennas 40-1 and 40-2 may perform 4×MIMO operations with antennas 40-3 and 40-4 in one or both of midband MB and high band HB and may additionally or alternatively perform 2×MIMO operations in low band LB with antenna 40-4 (e.g., as shown by coverage blocks 80 for antennas 40-1 through 40-4 in FIG. 4). If desired, antennas 40-1, 40-2, 40-3, and 40-4 may perform carrier aggregation in which multiple carrier frequencies in one or more of bands LB, MB, and HB are used to further increase data throughput.

When placed in the second operating mode, antennas 40U and 40L may perform 2×MIMO operations in one, two, or all of bands LB, MB, and HB. If desired, antennas 40U and 40L may perform carrier aggregation in which multiple carrier frequencies in one or more of bands LB, MB, and HB are used to further increase data throughput (e.g., where each of antennas 40U and 40L covers the same carrier frequencies so that 2×MIMO operations are performed for each carrier frequency in the carrier aggregation scheme).

While antennas 40-1 and 40-4 may perform 2×MIMO operations in low band LB while placed in the first operating mode, none of the antennas may perform 4×MIMO operations when the antennas are placed in the second operating mode, for example. In this way, four or more antennas 40 may be used to perform MIMO operations to increase overall data throughput relative to scenarios where only a single antenna is used, while also ensuring that there is satisfactory electromagnetic isolation between antennas operating at the same frequencies and, in the example of FIGS. 11-13, while also allowing for the antennas to be dynamically adjusted between different modes depending on antenna efficiency and data throughput requirements for device 10.

The example of FIG. 14 is merely illustrative. In general, efficiency curves 130, 132, and 134 may have any desired shape. Curves 130, 132, and 134 may exhibit peaks in efficiency in more than three frequency bands, in fewer than three frequency bands, or in any other desired frequency bands if desired. Similar efficiency curves may also be used to characterize antennas 40-3, 40-4, and 40L of FIG. 3 if desired.

A curve such as curve 132 of FIG. 14 (or a similar curve that follows the path of curve 132 at slightly lower efficiencies) may be used to characterize the performance of antennas 40-1 and 40-4 in scenarios where antennas 40-1 and 40-2 are formed from a continuous conductor and antennas 40-3 and 40-4 are formed from a continuous conductor (FIGS. 8-10). Similarly, a curve such as curve 134 (or a similar curve that follows the path of curve 134 at slightly lower efficiencies) may be used to characterize the performance of antennas 40-2 and 40-3 in the arrangement of FIGS. 8-10. Antennas 40-1, 40-2, 40-3, and 40-4 may perform 4×MIMO operations in midband MB and/or high band HB and/or may perform 2×MIMO operations in low band LB whether antennas 40-1 and 40-2 have resonating elements formed from a continuous conductor (FIGS. 8-10) or whether gap 84-3 is formed in housing wall 88 (FIGS. 11-13). If desired, any pair of antennas 40-1, 40-2, 40-3, and 40-4 may perform 2×MIMO operations in one or more of bands LB, MB, and/or HB (e.g., antennas 40 need not utilize their full data throughput capacity).

The foregoing is merely illustrative and various modifications can be made by those skilled in the art without departing from the scope and spirit of the described embodiments. The foregoing embodiments may be implemented individually or in any combination.

What is claimed is:

1. A portable electronic device, comprising:
    a housing having a peripheral conductive wall and having opposing first and second ends;
    a first antenna resonating element formed from the peripheral conductive wall, and having a first end at a first dielectric-filled opening in the housing and a second end at a second dielectric-filled opening in the housing;
    a second antenna resonating element formed from the peripheral conductive wall, and having a first end at the second dielectric-filled opening in the housing and a second end at a third dielectric-filled opening in the housing;
    a third antenna resonating element formed from the peripheral conductive wall, and having a first end at a fourth dielectric-filled opening in the housing and a second end at a fifth dielectric-filled opening in the housing;
    a fourth antenna resonating element formed from the peripheral conductive wall, and having a first end at the fifth dielectric-filled opening in the housing and a second end at a sixth dielectric-filled opening in the housing; and
    radio-frequency transceiver circuitry configured to concurrently convey radio-frequency signals at a given frequency using the first and fourth antenna resonating elements.

2. The portable electronic device defined in claim 1 further comprising:
    an antenna ground;
    a first antenna feed coupled between the antenna ground and the first antenna resonating element; and
    a second antenna feed coupled between the antenna ground and the second antenna resonating element.

3. The portable electronic device defined in claim 2 further comprising:
    first and second adjustable components coupled between the antenna ground and the first antenna resonating element, wherein the first antenna feed is interposed between the first and second adjustable components.

4. The portable electronic device defined in claim 3 wherein the second adjustable component is interposed between the first antenna feed and the first dielectric-filled opening and the second adjustable component is configured to tune the first antenna resonating element in a first frequency band.

5. The portable electronic device defined in claim 4 wherein the first adjustable component is configured to tune the first antenna resonating element in a second frequency band that is lower than the first frequency band.

6. The portable electronic device defined in claim 5 wherein the given frequency is in the second frequency band.

7. The portable electronic device defined in claim 5 wherein the radio-frequency transceiver circuitry is configured to concurrently convey radio-frequency signals at an additional frequency using the first, second, third, and fourth antenna resonating elements, and the additional frequency is in the first frequency band.

8. The portable electronic device defined in claim 3 further comprising:
    an additional adjustable component coupled between the first and second antenna resonating elements.

9. The portable electronic device defined in claim 8 wherein the additional adjustable component comprises switching circuitry, the switching circuitry has a first state at which the second antenna resonating element is shorted to the antenna ground along an antenna return path and the switching circuitry has a second state at which the antenna return path forms an open circuit between the second antenna resonating element and the antenna ground.

10. The portable electronic device defined in claim 3 wherein the first and second adjustable components each comprise inductors.

11. The portable electronic device defined in claim 10 wherein the first and second adjustable components form adjustable return paths.

12. The portable electronic device defined in claim 3, further comprising:
    a third antenna feed coupled between the antenna ground and the third antenna resonating element;
    a fourth antenna feed coupled between the antenna ground and the fourth antenna resonating element; and
    third and fourth adjustable components coupled between the antenna ground and the fourth antenna resonating element, wherein the fourth antenna feed is interposed between the third and fourth adjustable components.

13. The portable electronic device defined in claim 1 wherein the housing has first and second sides with a first length and third and fourth sides perpendicular to the first and second sides with a second length that is less than the first length, the second dielectric-filled opening is in the third side, and the fifth dielectric-filled opening is in the fourth side.

14. The portable electronic device defined in claim 13 wherein the first and fourth dielectric-filled openings are in the first side and the third and sixth dielectric-filled openings are in the second side.

15. An electronic device, comprising:
    a housing having a peripheral conductive wall;
    a dielectric-filled opening in the housing that divides the peripheral conductive wall into first and second segments, wherein dielectric material in the dielectric-filled opening extends from the first segment to the second segment;
    an antenna ground that is separated from the first and second segments by a slot;
    a first antenna having a first resonating element arm formed from the first segment and a first antenna feed coupled between a first location on the first segment and the antenna ground across the slot;
    a second antenna having a second resonating element arm formed from the second segment and a second antenna feed coupled between the second segment and the antenna ground across the slot;
    a first adjustable component that is coupled between a second location on the first segment and the antenna ground;
    a second adjustable component coupled between a third location on the first segment and the antenna ground, wherein the first location is interposed between the second and third locations;
    control circuitry coupled to the first and second adjustable components, wherein the control circuitry is configured to tune a resonant frequency of the first antenna.

16. The electronic device defined in claim 15 further comprising:
- a second dielectric-filled opening in the housing that divides the peripheral conductive wall into third and fourth segments, wherein dielectric material in the second dielectric-filled opening extends from the third segment to the fourth segment;
- a third antenna having a third resonating element arm formed from the third segment; and
- a fourth antenna having a fourth resonating element arm formed from the fourth segment.

17. The electronic device defined in claim 15 wherein the third location is interposed between the first location and the dielectric-filled opening, and the second adjustable component is configured to tune the first antenna at a first frequency.

18. The electronic device defined in claim 17 wherein the first adjustable component is configured to tune the first antenna at a second frequency that is higher than the first frequency.

19. An electronic device, comprising:
- a housing having peripheral conductive structures and having a rectangular periphery with first and second corners at a first end of the housing and third and fourth corners at a second end of the housing;
- a first antenna element at the first corner having first and second opposing ends that each terminate at dielectric material in the rectangular periphery at the first end of the housing;
- a second antenna element at the second corner having first and second opposing ends that each terminate at dielectric material in the rectangular periphery at the first end of the housing;
- a third antenna element at the third corner having first and second opposing ends that each terminate at dielectric material in the rectangular periphery at the second end of the housing; and
- a fourth antenna element at the fourth corner having first and second opposing ends that each terminate at dielectric material in the rectangular periphery at the second end of the housing.

20. The electronic device defined in claim 19 wherein dielectric material in the rectangular periphery extends from the first end of the first antenna to the first end of the second antenna and from the first end of the third antenna to the first end of the fourth antenna.

* * * * *